(12) United States Patent
Rayner

(10) Patent No.: US 9,427,071 B2
(45) Date of Patent: Aug. 30, 2016

(54) STRAP SYSTEM FOR ELECTRONIC DEVICE

(71) Applicant: TREEFROG DEVELOPMENTS, INC., San Diego, CA (US)

(72) Inventor: Gary A. Rayner, San Diego, CA (US)

(73) Assignee: TREEFROG DEVELOPMENTS, INC., San Diego, CA (US)

( * ) Notice: Subject to any disclaimer, the term of this patent is extended or adjusted under 35 U.S.C. 154(b) by 514 days.

(21) Appl. No.: 13/966,283

(22) Filed: Aug. 14, 2013

(65) Prior Publication Data

US 2014/0049060 A1 Feb. 20, 2014

Related U.S. Application Data

(60) Provisional application No. 61/683,178, filed on Aug. 14, 2012.

(51) Int. Cl.

| *B42F 9/00* | (2006.01) |
| *B43L 5/02* | (2006.01) |
| *A45F 5/10* | (2006.01) |
| *A45F 5/00* | (2006.01) |
| *A45C 13/30* | (2006.01) |
| *F16M 13/00* | (2006.01) |
| *F16M 11/10* | (2006.01) |
| *F16M 13/04* | (2006.01) |
| *A45C 1/06* | (2006.01) |
| *A45C 11/00* | (2006.01) |

(52) U.S. Cl.
CPC ............... *A45F 5/10* (2013.01); *A45C 13/30* (2013.01); *A45F 5/00* (2013.01); *F16M 11/10* (2013.01); *F16M 13/00* (2013.01); *F16M 13/04* (2013.01); *A45C 2001/065* (2013.01); *A45C 2011/003* (2013.01); *A45C 2200/15* (2013.01); *A45F 2005/008* (2013.01); *A45F 2200/0525* (2013.01); *G06F 2200/1633* (2013.01)

(58) Field of Classification Search
CPC ............ A45F 5/10; B42F 9/00; B42F 9/001; B43L 5/02
See application file for complete search history.

(56) References Cited

U.S. PATENT DOCUMENTS

| 4,097,878 | A | | 6/1978 | Cramer | |
| 4,243,249 | A | * | 1/1981 | Goss | B42F 9/001 108/43 |
| 4,264,049 | A | * | 4/1981 | Daniels | F16M 13/04 248/444 |
| 4,750,657 | A | * | 6/1988 | King | B43L 5/02 224/220 |
| 4,903,932 | A | * | 2/1990 | Stewart, Jr. | A45F 5/00 224/267 |
| 4,988,229 | A | * | 1/1991 | Ramsey, III | B42F 13/40 281/43 |
| 5,176,253 | A | * | 1/1993 | Perrin | A45C 7/0086 206/315.3 |

(Continued)

*Primary Examiner* — Brian D Nash

(57) ABSTRACT

This disclosure relates generally to an apparatus having a strap system and housing for an electronic device. The apparatus can include a housing that is configured to receive an electronic device and protect the device from damage resulting from impact or exposure to liquids. The strap system can attach to the housing with connectors to provide easy handling of the housing and the electronic device therein without compromising the integrity of the housing. This disclosure also relates to a stand for an electronic device. The stand can be stored on the electronic device to provide additional protection when the electronic device is not being used.

16 Claims, 32 Drawing Sheets

(56) References Cited

U.S. PATENT DOCUMENTS

| | | | |
|---|---|---|---|
| 5,263,618 A * | 11/1993 | Talavera | A45F 3/14 224/148.2 |
| 5,285,833 A * | 2/1994 | Haxby | A45C 1/04 150/102 |
| 5,823,500 A * | 10/1998 | La Coste | B43L 3/008 248/444 |
| 6,734,842 B2 * | 5/2004 | Woodmansee | G06F 1/163 345/169 |
| 7,158,376 B2 | 1/2007 | Richardson et al. | |
| 7,180,735 B2 | 2/2007 | Thomas et al. | |
| 7,318,521 B2 | 1/2008 | Lau | |
| D650,531 S * | 12/2011 | Young | D29/120.1 |
| 8,342,325 B2 | 1/2013 | Rayner | |
| 8,690,210 B1 | 4/2014 | May | |
| 2002/0085342 A1 | 7/2002 | Chen et al. | |
| 2007/0261978 A1 | 11/2007 | Sanderson | |
| 2010/0313329 A1 * | 12/2010 | Haynes | A41D 1/04 2/102 |
| 2012/0118773 A1 * | 5/2012 | Rayner | G06F 1/1626 206/320 |
| 2012/0314354 A1 * | 12/2012 | Rayner | G06F 1/1656 361/679.01 |
| 2013/0220841 A1 | 8/2013 | Yang | |
| 2013/0294020 A1 * | 11/2013 | Rayner | H05K 5/061 361/679.01 |
| 2014/0265298 A1 * | 9/2014 | Cooper | B42F 9/001 281/45 |
| 2014/0346201 A1 * | 11/2014 | Raeburn | B42F 9/001 224/250 |

* cited by examiner

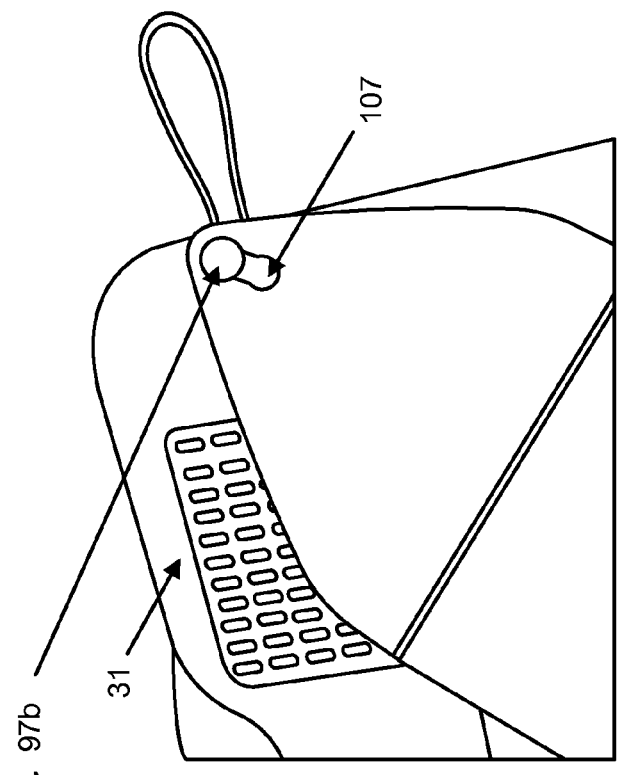
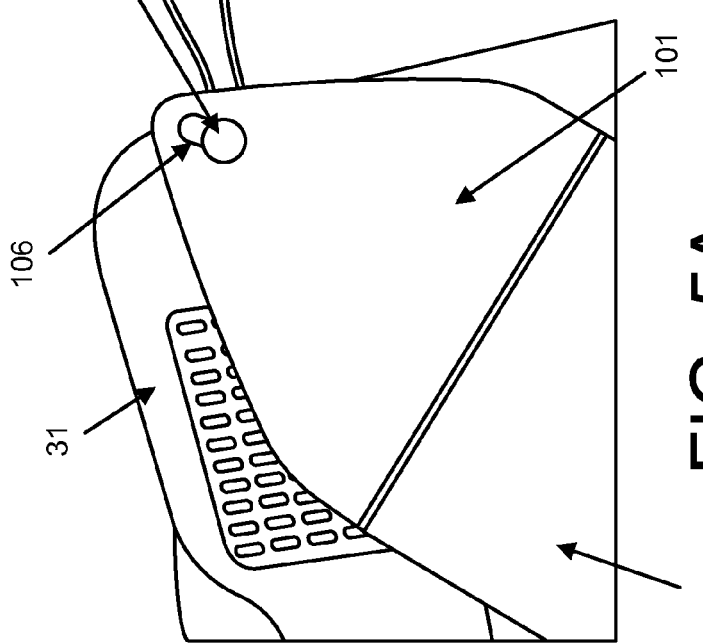
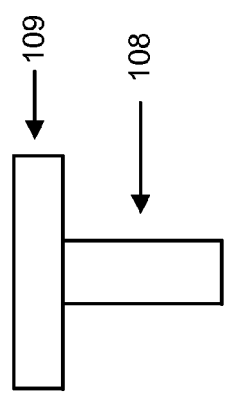
FIG. 5A
FIG. 5B
FIG. 5C

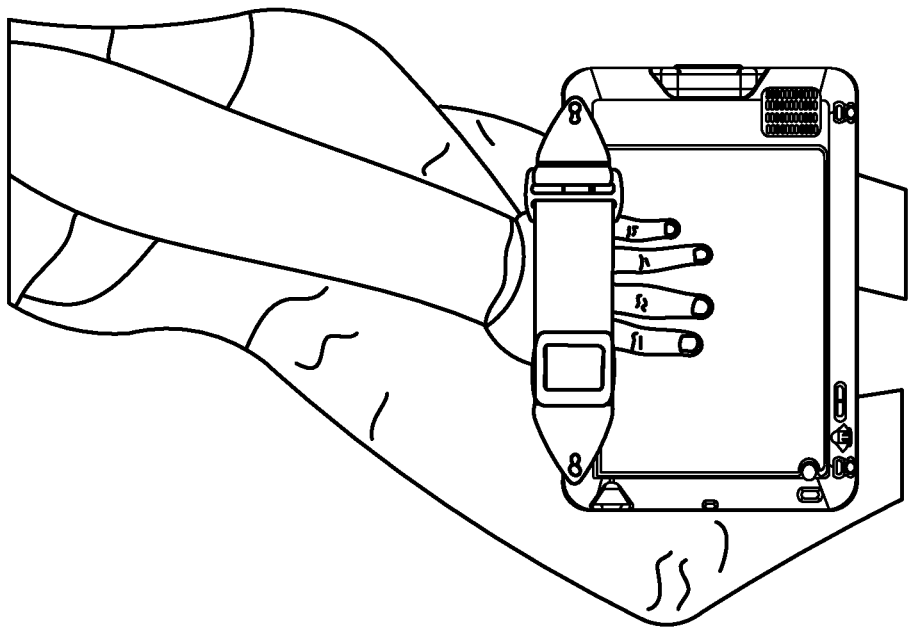
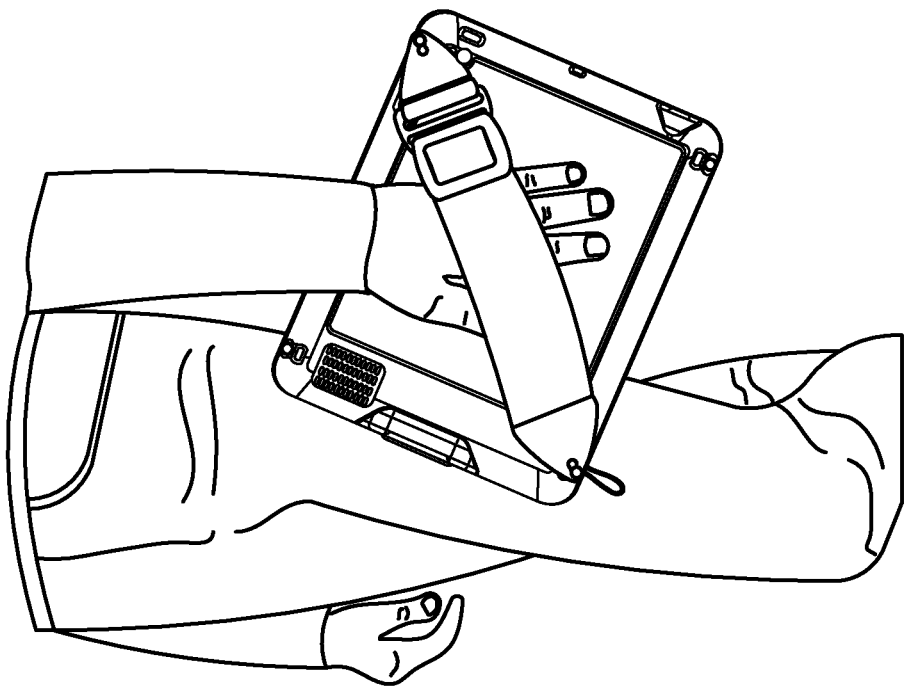
FIG. 9B
FIG. 9A

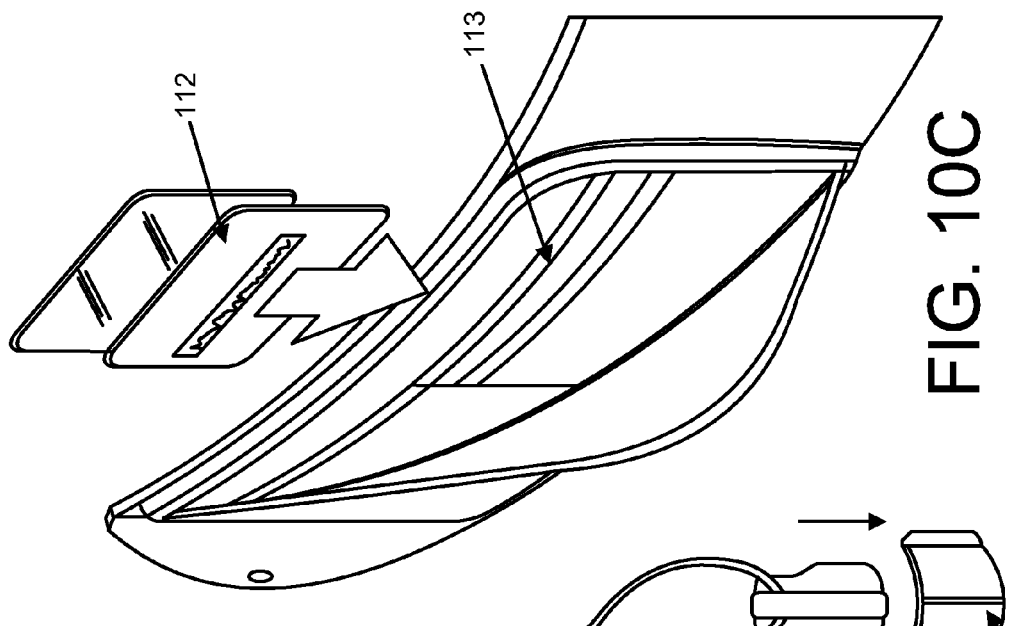
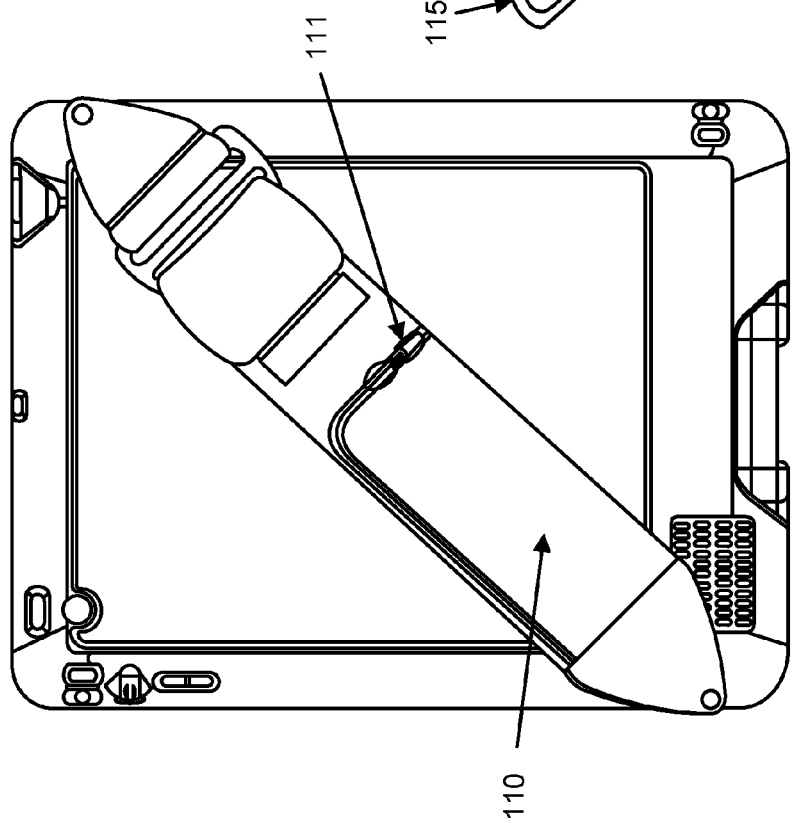
FIG. 10A  FIG. 10B  FIG. 10C

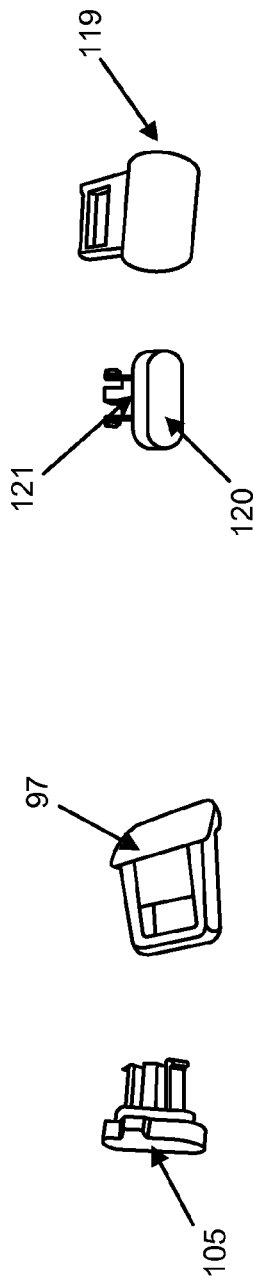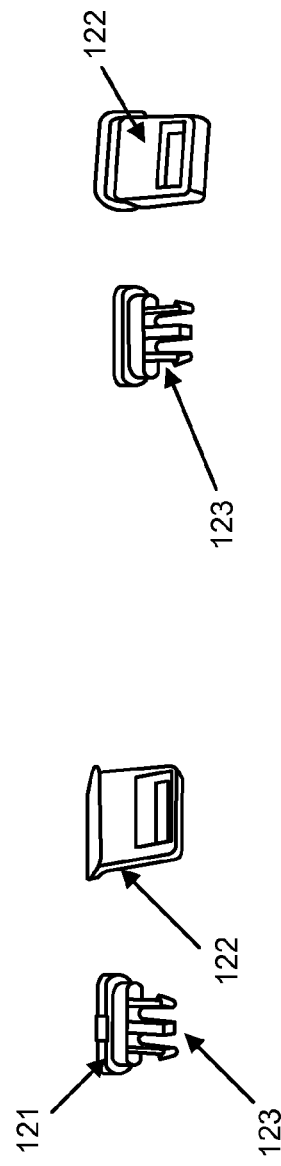
FIG. 14A FIG. 14B FIG. 14C FIG. 14D

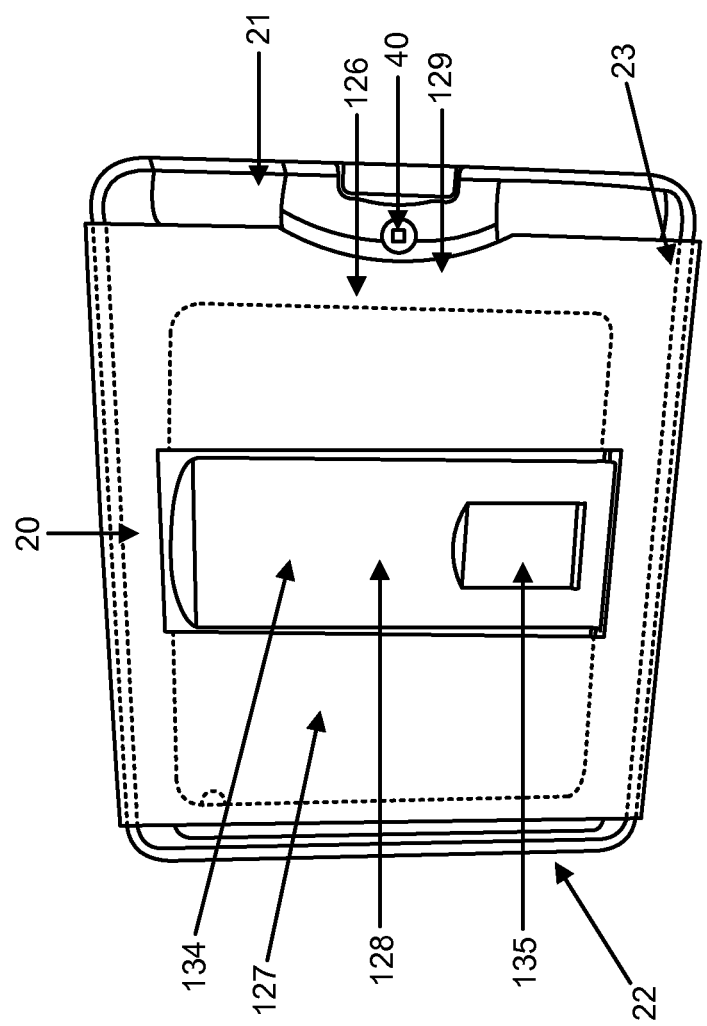

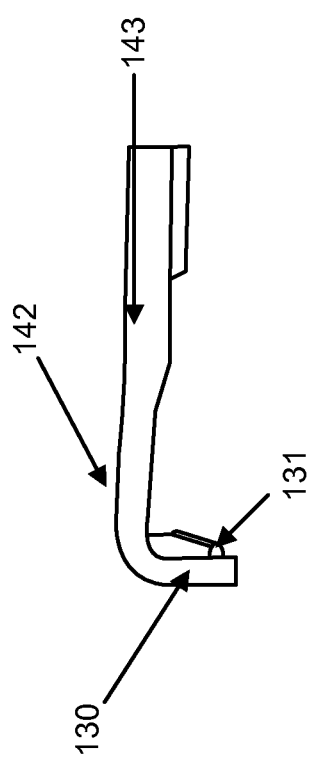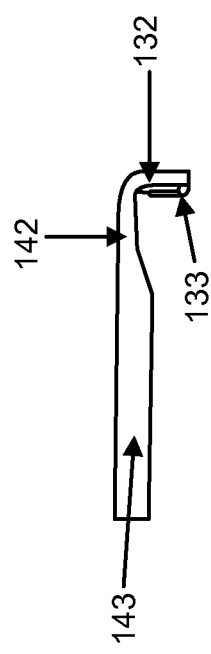
FIG. 19A
FIG. 19B

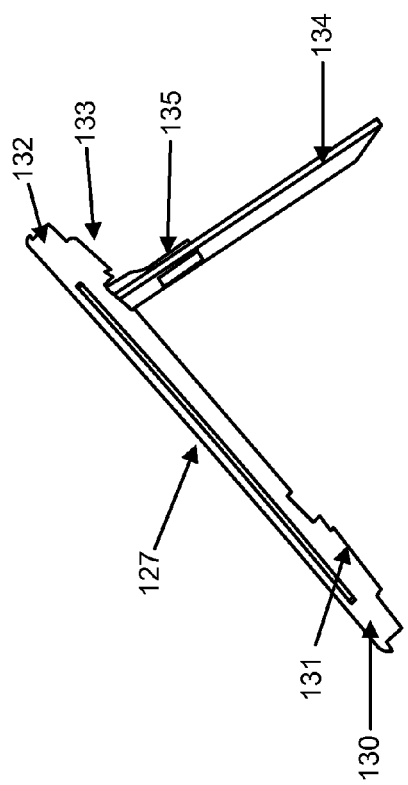
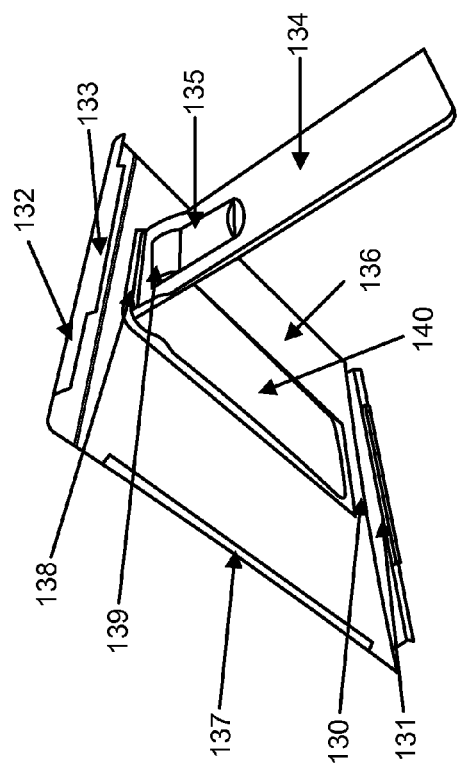
FIG. 20A
FIG. 20B

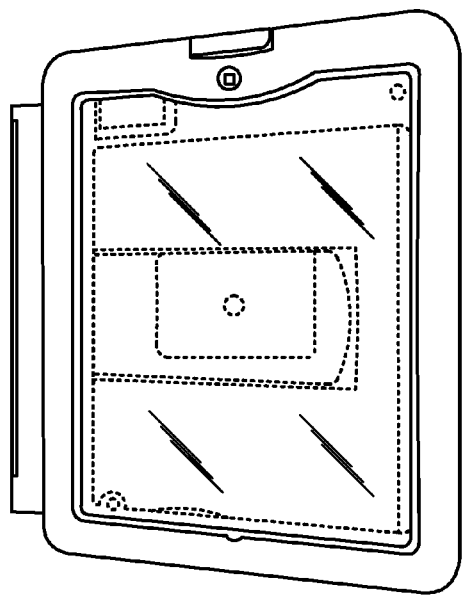
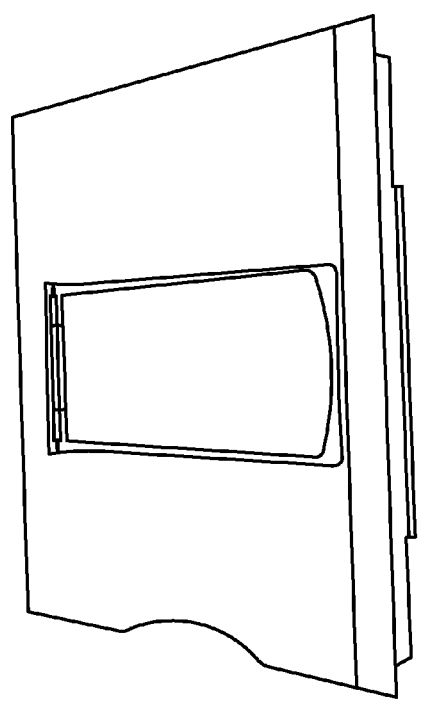
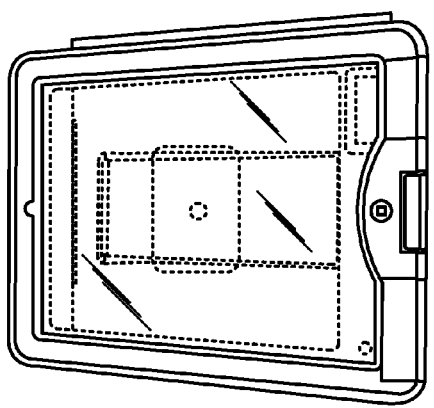
FIG. 21B
FIG. 21C
FIG. 21A

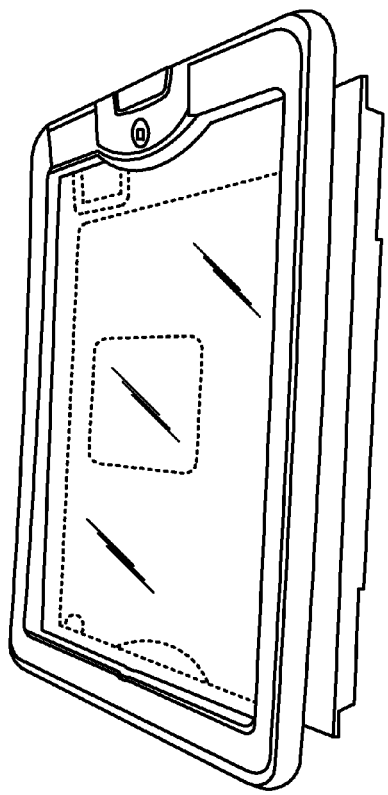
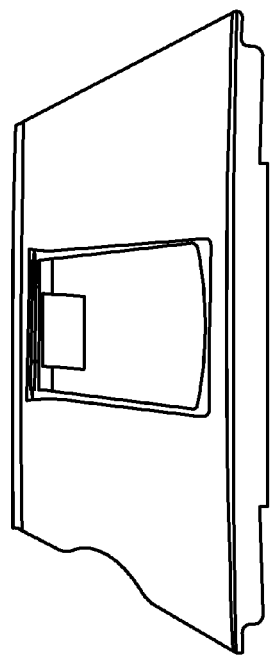
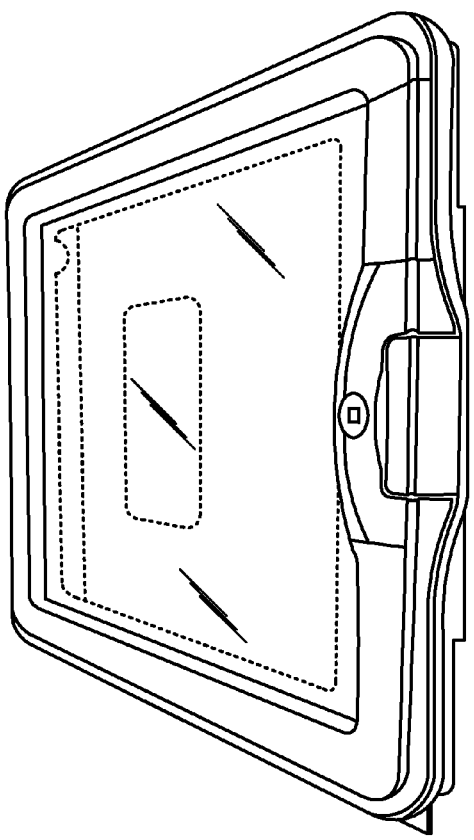
FIG. 23B
FIG. 23C
FIG. 23A

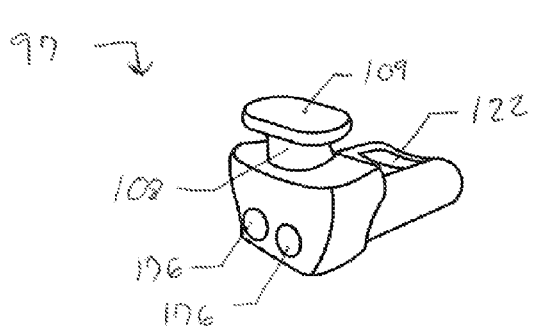
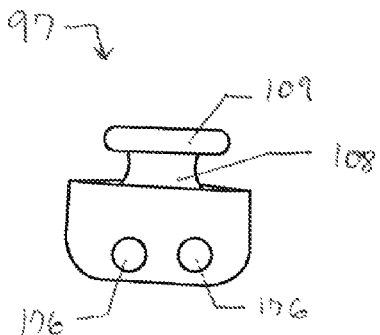
FIG. 25A  FIG. 25B
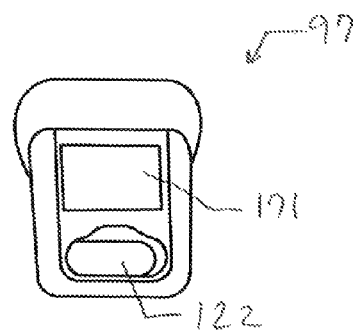
FIG. 25C

STRAP SYSTEM FOR ELECTRONIC DEVICE

CROSS-REFERENCE TO RELATED APPLICATION

This application claims the benefit of U.S. Provisional Patent Application No. 61/683,178, filed Aug. 14, 2012, which is hereby incorporated by reference in its entirety.

FIELD

This disclosure relates generally to a strap system attachable to a housing for an electronic device such as, for example, a smartphone, portable computer, tablet, e-reader, or the like. The housing can protect the electronic device from exposure to water, dust, or dirt, and can protect the device from damage resulting from mistreatment or mishandling. The strap system can permit a user to hold the housing with one hand, on one's shoulder, around one's leg, and/or mounted in conjunction with an external mounting system. In another aspect, this disclosure relates to a protective shield and/or stand for positioning a housing for an electronic device in a way that permits a user to easily view or interact with the electronic device. In another aspect, the disclosure relates to a mounting system interface, where the housing can easily be mounted in a given orientation on a variety of different substrates.

BACKGROUND

Dirt, mud, rain, snow, and water can be damaging to various electronic devices, such as smartphones, portable computers, GPS receivers, personal digital assistants, tablets, and e-readers. Additionally, objects that are fragile or otherwise breakable can be damaged by mistreatment or mishandling. It is, therefore, useful to have a housing within which the electronic device can be housed to protect it from inclement weather, mistreatment, and/or mishandling.

Desktop computers are well known in the art and commonly offer extensive processing power and memory. Mobile computers are also well known and provide similar functionality as standard desktop computers, but typically have less memory and/or processing power. Most mobile computers are capable of performing word processing tasks, spread sheet production, power-point generation, and typically have mobile broadband connectivity. Since most users are not running applications that require extensive processing power or substantial memory, mobile computers provide adequate functionality for most users and much greater convenience. For these reasons, mobile computers continue to gain popularity among consumers.

Mobile computers serve the same basic functions as their counterpart desktop computers, however, typically with less processing power and memory as well as less extensive word processing capabilities, etc. Nevertheless, for general use, all that is needed is internet connectivity as well as the ability to obtain e-mail and read electronic data, such as e-books, and/or perform a comparatively limited word processing, spread sheet production, and power point generation and presentation. These functionalities are well suited for tablet style computers and even mobile telephones having such functionality (i.e. smartphones), which by their nature are designed to be thin and lightweight. Mobile digital tablet computers and smartphones, therefore, have become increasingly popular with the general user.

With respect to tablet computers and mobile telephones with computing functionality, such electronic devices are well known and are widely used. Tablet computers and smartphones are convenient tools which allow continual access to the internet, make reading electronic books easy, and facilitates communications between people, e.g., via phone, e-mail and/or various social media modalities, when away from traditional telephone landlines or desktop computers.

Mobile electronic devices allow people to connect to the internet, download and read or watch books and movies, as well as communicate with others via voice, text message, instant message, social media modalities, and the like. Often these devices allow further functionalities such as word processing, spread sheet production, and power point generation and presentation. Electronic readers are devices that are similar to tablet computers, but with even more limited computing functionality yet, nevertheless, allow a user to easily store, view, and read various print media.

While tablet computers, mobile telephones, and electronic readers may be portable and handy to use, they suffer from certain drawbacks. For example, they are often expensive and contain fragile electronic components that make them prone to damage due to inclement weather and/or mishandling. Consequently, these devices need to be protected from the environment and/or mishandling. An additional drawback is that, such devices, e.g., tablet computers and/or mobile telephones, are often difficult to hold and position in ways that are comfortable to watch and/or read for long periods of time and/or to type on or interact with. For instance, tablet computers and certain smartphones can be larger than a user's palm, thereby requiring the user to use two hands when holding the device.

There is a need in the art for an apparatus whereby an object, such as a portable tablet computer, mobile telephone, an electronic reader device, or the like, can be protected from inclement weather, mishandling, or other damage that may result from contacting water, dirt, mud, and the like and also be held or positioned in a comfortable manner for watching, reading, or typing, for instance, to increase or otherwise enhance usability. The present disclosure is directed to a mounting system and/or protective cover and/or a stand for a housing used to house an object, such as a tablet computer, mobile telephone, or electronic reader and/or the like and/or the components thereof, as well as methods for using the same, in a manner that offers protection for the electronic device from adverse environmental conditions, inclement weather, mishandling, or damage, such as from contacting a fluid, such as water, while allowing the device to be more comfortably used. Systems for the same are also provided.

SUMMARY

The disclosure provides a mounting and/or protective system and/or stand for a protective housing for an electronic device. In one aspect, the housing has a mounting system that includes one or more mounting elements and/or strap members positioned along a portion, e.g., a perimeter portion, of the housing, such as a plurality of mounting elements positioned at the corners of the housing. In addition to the mounting elements, the mounting system can include one or more mounting strap members.

A suitable mounting strap can include a first side and a second side and further include a first and a second end. The mounting strap may additionally include a first and a second strap mount connecting member or connector that are configured for connecting the first and second ends of the strap to the housing e.g., via the interaction of the mounting elements with the housing and/or the first and second ends of the mounting strap. In various instances, the mounting strap may be flexible and may extend from at lest one portion of the housing to the other, such as across one portion of the back surface of the housing to the other, for instance, from one corner portion to the other, so as to be connected to the housing via complementary mounting elements. In various embodiments, the housing may be a waterproof and/or shockproof housing.

In certain embodiments, the strap is a first flexible mounting strap that is connected to the housing for the electronic device, e.g., via complementary mounting elements, at one or more corners of the housing, such as at one, two, three, or four, or more corners of the housing. More specifically, in certain embodiments, the first flexible strap is connected to the housing for the electronic device at one side or corner of the housing and it extends diagonally, vertically, or horizontally across to a second side or corner of the housing. In various instances, the mounting strap may be configured as a handle, such as a briefcase or luggage type of handle; in other instances, the mounting strap may be configured as a band, such as purse strap like band or messenger bag like band; and in other instances, the strap may be configured as a webbing, such as nylon or neoprene webbing, so as to include one or more cavities into which one or more of the fingers, a hand, an arm, a leg, or the like, may be positioned. In various instances, the mounting strap may span from one side portion to another, wherein the connection point is along the side and not in the corner. In certain instances, one, two, three, four, five, or more mounting straps may be included.

For example, in certain embodiments, the mounting strap may comprise a strap system that includes at least a first and a second flexible strap one or more of which include a first and a second end; and connectors, such as mounting connectors, which connect the first and second straps to the housing at the first and second ends of each of the first and second straps. For instance, the first and second straps can both extend diagonally across the back side of the housing. The first and second flexible straps can also cross or not cross each other as they extend across the second side of the housing. In certain instances, the first and/or second straps may be configured as a glove element.

In various embodiments, the mounting elements include mount connector members or connectors that may be configured so to interact with the housing, e.g., be attached thereto, by any of various manners as known in the art, such as by non-penetrating or penetrating a portion of the housing. For example, the mount connectors may attach the one or more strap ends, e.g., at the strap mount connecting member, to the housing in a non-penetrating manner, such as by welding, moulding, an adhesive, stitching, hook and loop fastening, buttons, clips, folding, zipping, and the like.

In various instances, the mounting elements, e.g., connectors, may attach the one or more strap ends to the housing in a penetrating manner, such as by being screwed, bolted, riveted, inserted, etc. therein. For instance, in various embodiments, the mounting system may include a plurality of members, such as a strap, having one or more strap mount connection members, and a mounting element, having a corresponding mount connector member. A strap mount connection member may have any suitable configuration so long as it is capable of connecting the strap to a mounting connector member and/or the housing of the case. Further, a corresponding mounting element likewise may have any suitable configuration so long as it is capable of coupling the strap to the housing of the case.

In certain instances, the mounting element may include at least a first mounting connector having a first mount association member, and may further include a second mounting connector having a second mount association member, wherein the first and the second mount association members may be configured for being coupled together, such as removably coupled together, for instance, in such a manner that a mounting strap may be coupled to the housing thereby, such as in a penetrating manner.

More specifically, in various instances, a suitable mount connector member may be configured as an elongated member, wherein on one end portion of the elongated member a strap connection member is positioned, and on another end member of the elongated member a mount association member is positioned. The strap connection member may be separated from the mount association member by an elongated portion. Further, the strap connection member may be removably coupled to the mount association member. The strap connection member may be configured for removably connecting the strap to the mounting element, and the mount association member may be configured for interacting with a second, corresponding mount association member so as to connect the strap to the housing.

Accordingly, in certain embodiments, a strap connection member may include a first strap mount association member configured for interfacing with a first mounting element; wherein the first mounting element includes a first strap connection member on one end, and a first mount association member, configured for engaging a second mount association member of a second mounting element, on the other end. The strap connection member may have any suitable configuration so long as it is capable of being coupled to a strap of the disclosure. For instance, the strap connection member may be configured to include a strap receiving aperture on one end through which aperture a portion of the strap may be received.

The mount association member may also have any suitable configuration so long as it is capable of coupling the mounting element to the housing, such as via engagement with a second mounting element. Accordingly, in one embodiment, one end of the mounting element includes a mounting association member that includes a first mount impinging member having a mount connection impinging element positioned thereon, e.g., one or more tines. In such an instances, the second mounting element may include a second mounting association member that includes a mount receiving member having a connection receiving element positioned thereon.

In various instances, the connection receiving element may be configured as an opening having one or more flexible members, e.g., tines, positioned therein and adapted to interact with one or more corresponding elements, e.g., tines, comprised within the connection impinging element. Likewise, in various instances, the connection impinging element may be configured so as to include one or more extended members that are adapted to interact with one or more corresponding elements comprised within the connection receiving element.

In certain embodiments, a first mounting connector member may be configured as a peg, such as a peg having a mount association member configured as one or more flexible tines positioned thereon; and a second mounting connector may be configured as a peg receiving member having a second mount association member configured as one or more flexible tine receiving elements positioned thereon. At least one of the peg and/or peg receiving elements may further include a strap connection member additionally positioned thereon. Accordingly, in various instances, the housing may include one or more mount association apertures, such as positioned at the corners or sides of the case housing, which are configured so as to receive one or more mount association members, e.g., of corresponding mounting elements, therein so as to couple a mounting strap to the housing.

For instance, the housing may include a mount aperture that is configured for receiving therein a first and/or a second mount association member of a first and/or second mounting element, such as where the first mount association member is configured as a peg receiving member, which peg receiving member is configured for being fit within a first portion of the mount aperture; and the second mount association member is configured as a peg member, which peg member is configured for being fit within a second portion of the mount aperture. In such an embodiment, the peg receiving member and peg member of the first and second mount association members are configured for associating with one another within the mount aperture so as to removably or non-removably couple an associated strap member to the housing. Hence, the first and second mount association members may be configured for removable or non-removable coupling. A locking element may further be included.

The housing may include one, two, three, four, five, or more mount association apertures, positioned anywhere on the top and/or bottom surface of the housing, such as in one or more, e.g., all, of the corners. The mounting elements may include first and second connector members which may include a first mount association member, e.g., configured as a peg, and a second mount association member, e.g. configured as a peg receiving member, which first and second association members are capable of being positioned within the one or more association apertures so as to couple the strap to the housing. Consequently, the one or more association apertures may be positioned at each site that the mount connector members attach to the housing, wherein the mount connection end of the mount connector is inserted into the housing in a connection end slot and the connection peg is inserted into the housing at a connection peg slot. The connection end slot and the connection peg slot can be connected to each other within the housing.

In certain embodiments, when the connection end is inserted in the connection end slot in the association aperture and the connection peg is inserted in the connection peg slot the connection end interacts with the connection peg so that the connection end and connection peg provide a force that tends to prevent either the connection peg or connection end from exiting the connection peg slot or the connection end slot. In certain embodiments, e.g., as described above, the connection end comprises an internal slot, and the connection peg comprises an internal tab that are capable of interacting with one another so as to couple the connection end of the first connector element with the connection peg of the second mount connector member, e.g., via corresponding tines. In other embodiments, the connection peg comprises an internal slot and the connection end comprises an internal tab. In other embodiments, the connection end and peg can connect to each other by any method known in the art.

In certain embodiments, the internal tab of the connection peg fits inside the internal slot of the connection end, wherein the interaction of the internal tab of the connection peg and the internal slot of the connection end produces a force that prevents the internal tab from removing from the internal slot. However, in other embodiments, the connection peg and end may interact to produce this force using any mechanism known in the art.

In certain embodiments, one or more of the mount connectors are configured such that the strap connection member is a strap receiving aperture, and in other embodiments the strap connection member is configured as a post or mushroom peg element. Accordingly, the strap may be configured to attach to the strap through a post and button or aperture on the connector and a slot or hook on the strap. For instance, the strap can include an aperture in its first or second ends, wherein the aperture comprises a proximal and a distal end, wherein the proximal end of the aperture comprises a diameter that is as great or greater than the diameter of the button and the distal end of the aperture comprises a diameter that is less than the diameter of the button and greater than the diameter of the post. In various embodiments, the strap includes a hook or plug like mechanism that is capable of interfacing with a corresponding strap receiving aperture of a mounting connector member.

In other embodiments, the mount connector members attach to the first flexible strap through a fabric hook and loop fastener. In other embodiments, the strap comprises a first piece of flexible fabric and a second piece of flexible fabric, wherein the first piece of flexible fabric has a first end comprising a plurality of hooks of a hook and loop fastener on its surface and a second end comprises a plurality of loops of a hook and loop fastener on its surface, wherein the second piece of flexible fabric comprises a solid loop on its end, wherein the first piece of fabric passes through the loop and folds back on itself so that the hooks and loops on its first and second ends join to fasten the ends together.

In certain embodiments, the mount connector members can also attach to the first flexible strap through a hook and loop system. The connectors can also attach to the second flexible strap through a post and button on the connector and a slot on the strap.

The disclosure also provides a strap system for a protective housing for an electronic device or an electronic device without a housing, wherein the housing has a first side and a second side and four corners comprising a flexible strap comprising a handle region with a first and second end and a first, second, third and fourth ends; and connectors that connect the first, second, third and fourth ends of the flexible strap to the housing, wherein the first end of the handle region meets the first and second ends of the flexible strap, wherein the second end of the handle region meets the third and fourth ends of the flexible strap, wherein each of the ends of the flexible strap are attached to each of the four corners of the housing, the flexible strap extends across the second side of the housing and the first side of the housing allows for interaction with the electronic device.

In one embodiment, the site where the first end of the handle region and the first and second ends of the flexible strap meet form an angle of between 91 and 180 degrees. In another embodiment, the handle region is between 4 and 10 inches in length. In other embodiments, the handle region is 5-9, 6-8, or about 4, 5, 6, 7, 8, 9 or 10 inches in length.

In other embodiments, the strap system is for a housing of an electronic device and the connectors are attached to the housing by penetrating the housing. The connectors can include a connection end and a connection peg at each site that the connectors attach to the housing, and wherein the connection end is inserted into the housing in a connection end slot and the connection peg is inserted into the housing at a connection peg slot. The connection end slot and the connection peg slot can be connected to each other within the housing.

In certain embodiments, when the connection end is inserted in the connection end slot and the connection peg is inserted in the connection peg slot the connection end interacts with the connection peg so that the connection end and connection peg provide a force that tends to prevent either the connection peg or connection end from exiting the connection peg slot or the connection end slot. In certain embodiments, the connection end comprises an internal slot and the connection peg comprises an internal tab. In other embodiments, the connection peg comprises an internal slot and the connection end comprises an internal tab. In other embodiments, the connection end and peg can connect to each other by any method known in the art.

In certain embodiments, the internal tab of the connection peg fits inside the internal slot of the connection and wherein the interaction of the internal tab of the connection peg and the internal slot of the connection end produces a force that prevents the internal tab from removing from the internal slot. However, in other embodiments, the connection peg and end may interact to produce this force using any mechanism known in the art.

In other embodiments, the connectors attach to the first flexible strap through a post and button on the connector and a slot on the strap. The first flexible strap can include an aperture in its first or second ends, wherein the aperture comprises a proximal and a distal end, wherein the proximal end of the aperture comprises a diameter that is as great or greater than the diameter of the button and the distal end of the aperture comprises a diameter that is less than the diameter of the button and greater than the diameter of the post.

In certain embodiments, the connectors can also attach to the first flexible strap through a hook and loop system. The connectors can also attach to the second flexible strap through a post and button on the connector and a slot on the strap.

The disclosure also provides a method of attaching one or more flexible straps to a housing for an electronic device or an electronic device itself using the flexible straps and connectors described above.

The disclosure also provides a cover and/or stand for a mobile electronic device, such as a tablet computer or mobile telephone, or a housing for a mobile electronic device, such as a tablet computer or mobile telephone, comprising a flat body that is configured to cover the screen of the electronic device or the screen aperture of the housing for the electronic device, wherein the flat body comprises a right side and a left side, wherein the right side comprises a right side protector and a right side tab and wherein the left side comprises a left side protector and a left side tab, wherein the side protectors extend at approximately 80-100 degrees from the surface of the flat body, wherein the side protectors are configured to cover the right and left side of the electronic device or the housing for the electronic device, wherein the side tabs are configured to reach around the sides of the body of the electronic device or the housing for the electronic device to removably attach the flat body of the stand to the electronic device or the housing for the electronic device so that the screen of the electronic device or the screen aperture of the housing for the electronic device is covered; and a first and a second folding member located on the side of the flat body, wherein the first folding member is foldably attached to the flat body, wherein the first folding member is a first length, wherein the second folding member is a second length, wherein the first length is longer than the second length.

In one embodiment, the second folding member is foldably attached to the first folding member. In another embodiment, the first folding member folds into a cavity on the flat body. In yet another embodiment, the second folding member folds into a cavity on the first folding member and/or the flat body. Accordingly, the second folding member can fold into a cavity in the first folding member, which in turn can fold into a cavity on the flat body. In this embodiment, the cavity in the first folding member may pass through the first folding member. Thus, in some embodiments, the second folding member can fold either way through the cavity in the first folding member.

In another embodiment, the flat body further comprises a cut out on its bottom side for allowing access to a control for the tablet computer or the housing for the tablet computer. In yet another embodiment, the first folding member comprises a tab that allows the first folding member to be easily folded out from the cavity in the flat body. Also, the second folding member can include a tab that allows the second folding member to be easily folded out from the cavity in the flat body or from the cavity in the first folding member.

The disclosure also provides a method of watching or reading from an electronic device, such as a tablet computer or mobile telephone, either alone or contained within a housing therefore, comprising placing the electronic device, e.g., tablet computer or the housing for the tablet computer, on the flat body of the stand described above, wherein the stand is placed on a flat surface, wherein the first folding member is extended so that one side of the flat surface and the end of the first folding member contact the flat surface, thereby holding the electronic device or the housing for the electronic device at an angle optimal for viewing or reading from the tablet computer. The optimal angle can be between 30 and 89 degrees. Alternatively, the optimal angle can be 30-40, 40-50, 50-60, 60-70, 70-80 or 80-89 degrees. The optimal angle can also be about 30, 40, 50, 60, 70, 80 or 89 degrees. In other embodiments, the second folding member engages the flat body, thereby holding the first folding member in an extended state.

The disclosure also provides a method of typing on an electronic device, such as a tablet computer or mobile telephone, either alone or contained within a housing therefore comprising placing the electronic device or the housing for the electronic device on the flat body of the stand of described above, wherein the stand is placed on a flat surface, wherein the second folding member is extended so that one side of the flat surface and the end of the second folding member contacts the flat surface, thereby holding the electronic device, e.g., tablet computer or the housing for the tablet computer, at an angle optimal for typing on the tablet computer. The optimal angle can be between 2 or 5 and 40 degrees. Alternatively, the optimal angle can be 5-10, 10-20, 20-30 or 30-40 degrees. The optimal angle can also be about 5, 10, 20, 30 or 40 degrees.

The details of one or more variations of the subject matter described herein are set forth in the accompanying drawings and the following description.

BRIEF DESCRIPTION OF THE DRAWINGS

These and other aspects will now be described in detail with reference to the appended drawings. Like reference symbols in the various drawings indicate like elements.

FIGS. 5A-C provide views of a fastening system between a connector and a strap system, as well as a schematic for a portion of a connector.

FIGS. 9A-B provide views of various configurations of strap systems for a housing for a tablet computer.

FIGS. 10A-C provide specific embodiments for a pocket and zipper system for a strap system for a housing of a tablet computer.

FIGS. 14A-D provide views of connectors for a strap system to attach to a housing for a tablet computer.

FIGS. 17A-E provide various views of a stand for a tablet computer or a housing for a tablet computer.

FIGS. 19A-B provide views of stand for a tablet computer or a housing for a tablet computer.

FIGS. 20A-B provide views of stand for a tablet computer or a housing for a tablet computer.

FIGS. 21A-C provide views of stand for a tablet computer or a housing for a tablet computer.

FIGS. 23A-C provide views of stand for a tablet computer or a housing for a tablet computer.

FIGS. 25A-B shows views of a connection end with a button and with holes to accommodate a loop, but with no loop attached to the connection end.

FIG. 25C shows a bottom view of the connection end showing an internal slot and a recess to receive and store knotted ends of a loop, if a loop were attached.

DETAILED DESCRIPTION

Figure 1A:
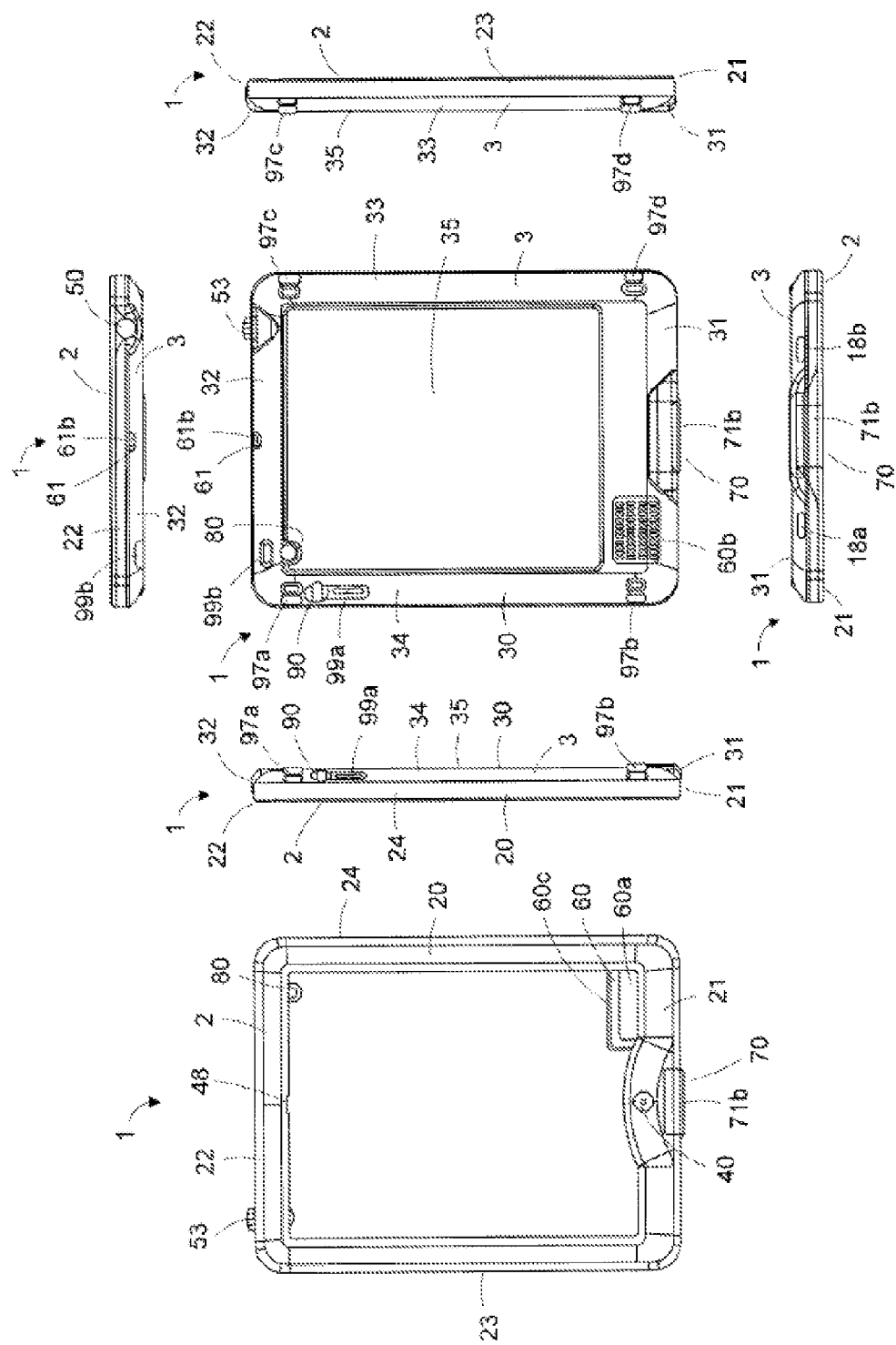
FIGS. 1A-D provide various views of the front, back, and side surfaces of a protective housing of the disclosure.

The subject matter described herein relates generally to a strap system and/or stand for an object (e.g., an electronic device) and/or for a housing for the object. Although the singular "object" is used herein, the term can encompass one or more objects. The object or objects can be any object that is/are capable of fitting within the housing or in need of protection from adverse environmental conditions, mishandling, or damage, such as damage from contacting a liquid, such as water. In certain instances, the object can be an electronic device, such as a mobile tablet computer, mobile telephone, or a mobile electronic reader, or the like. The housing can be of any appropriate size and dimension so long as it is capable of housing the object and protecting it, for instance, from adverse environmental conditions and/or rough treatment. The object can be a single object, such as an electronic device, or can be a plurality of objects, such as a plurality of electronic devices or a set of components that make up an electronic device.

In various embodiments, the object can be an electronic device, such as a computer, tablet computer, mobile telephone, electronic reader, personal digital assistant, digital camera, pager, portable gaming device, or the like. In particular embodiments, the object can be a mobile tablet computing device, such as a tablet computer, mobile telephone device, or digital reader. It is to be understood that although the strap system is described with respect to a particular embodiment, e.g., where the object is a tablet computing device, this is for exemplary purposes only as the object to be encased may be any suitable object capable of being encased within a housing.

Accordingly, the housing may be in the form of any typical container known and used in the art for containing the particular object. For example, the container can be a housing configured for opening and closing around the object, such as around a mobile tablet computer, mobile phone with computing functionalities, digital assistant, camera, gaming device, and the like, and thereby providing liquid and shockproof protection therefore. So being, the housing may form any suitable container meant to contain particular object and prevent it from being damaged due to environmental factors and/or mishandling.

In certain embodiments, the housing may form a case configured for at least partially encasing a device, such as an electronic device, for example, a mobile tablet computer, mobile telephone, and/or electronic reader device, etc. In other instances, the housing is part of a device, such as an electronic device, which housing encases various components of the electronic device. For example, the housing may be the housing of a mobile tablet computer or telephone or reader device, or other electronic device, that encases the electronic components of the mobile device (or other electronic device).

Accordingly, in various aspects, a housing for at least partially encasing an object, such as a tablet computer, mobile telephone, or electronic reader, methods of using the encased object, e.g., device, and/or systems for the same are provided. For instance, in one particular embodiment, a housing for housing a device, such as a tablet computer device, mobile telephone, or electronic reader, is provided. The housing may be configured such that the electronic device may be fitted within the housing and be substantially protected thereby, such as from liquid, shock, dirt, dust, and the like. The housing may include a plurality of separate members or separate portions of the same member, such as a top member portion and a bottom member portion that are designed to be coupled together to from a housing. In various embodiments, the top and bottom members may be separate members that may be associated via a third element, such as a hinge element, and/or may include two members that are to be locked together by a common third member, e.g., a locking element. In such instances, the top and bottom member portions are designed to come together around an object, e.g., electronic device, to be encased so as to form a liquid-tight seal.

In certain embodiments, the housing is one of the housings described in U.S. patent application Ser. No. 13/517,583, incorporated herein in its entirety. One embodiment of the housing is provided in FIG. 1A.

FIG. 1A shows a protective housing 1 that is configured to house an object. The object can be any object that can be housed in accordance with the description provide herein. For instance, in certain embodiments, the object to be housed can be an electronic device, such as a tablet computing device, mobile telephone with computing functionality, an electronic reader, or the like. In certain instances, the electronic device to be encased may be a handheld mobile electronic device, for example, a tablet PC, mobile telephone, electronic reader, personal digital assistant, electronic game device, personal organizer, or the like. It is to be noted that based on the configuration of the individual components of the housing, the housing may at least partially encase the electronic device. The encasement can be an entire encasement, or a less than an entire encasement. For example, in certain instances, a portion of the top or bottom member that form the protective housing may be open, such as where the top or bottom member does not include a front or back surface, e.g., where the top or bottom member has no membrane or other suitable material covering an opening therein, or the encasement may be an entire encasement, where the top and bottom member fully surround and encase the entire electronic device, or the encasement may be partial, where the top and bottom member encase the electronic device except for those portions substantially adjacent to a display on the electronic device, such as a touch-sensitive display of the electronic device. In such instances, the housing (e.g., top and/or bottom member) may have an open aperture, such as adjacent the display, thereby allowing direct touch access to the display; or the housing may have an aperture that is spanned by a permanently or removably fixed membrane. The membrane may be affixed to the housing or to the device, e.g., over the display, so as to provide indirect touch access to the display, e.g., touch sensitive display.

In particular embodiments, the protective housing 1 may include a top member 2 and a bottom member 3 that when removably or fixedly coupled together form the protective housing 1. FIG. 1A provides a top view of the top member 2, a bottom view of the bottom member 3, as well as profile views of all four sides of the protective housing 1. As depicted with respect to FIG. 1A, the protective housing includes a plurality of members, such as top member 2 and bottom member 3 that, in various embodiments, are configured for being removably coupled together so as to form the protective housing 1. It is to be understood, however, that although a particular embodiment is presented herein, such as a protective housing 1 for housing an electronic device, such as a tablet PC, mobile phone, or electronic reader, etc., the object to be housed may be any of a number of different objects, and the protective housing may, therefore, have a number of different members having a number of different shapes, sizes, and configurations without departing from the nature of the disclosure.

The protective housing can include two separate members, e.g., a separate individual top member 2 and bottom member 3, configured for being removably or permanently coupled together so as to surround an electronic device and thereby house the device. However, in certain instances (not shown), the top and bottom members may not be separate members, but rather may be members that are joined, for instance, by a common hinge element, or may be fabricated from a single member configured for being folded upon itself and thereby forming the protective housing. In other instances, the protective housing 1 may include more than two separate members, such as a separate top member 2 and bottom member 3 as well as a separate clasping and/or locking element (not shown) that when assembled together form the protective housing 1. Hence, the scope of the housings and systems described herein with respect to the particular embodiments set forth in reference to the figures is not intended to be unduly limiting.

The top member 2 of the protective housing 1 may include a top member front and back surface, such as a membrane spanning the peripheral portion (not included in this embodiment), and a top member peripheral portion 20. However, in this embodiment, the top member 2 does not include a top member front and back surface. Rather, in the depicted embodiment, the top member 2 simply includes a top member peripheral portion 20. The top member peripheral portion 20 of the top member 2 may be defined by a top member lower end portion 21 and a top member upper end portion 22 as well as opposing side portions, including a top member left hand side portion 23 and top member right hand side portion 24. The top member peripheral portion 20 may include a plurality of additional features, such as a headphone port 50 (not shown), having a headphone port sealing port member 53 positioned therein, as well as a charge port opening 71a (not shown). The top member 2 may additionally include one or more button features, such as a home button feature 40.

The bottom member 3 of the protective housing 1 can include a bottom member front and back surface ("surface") 35 surrounded by a bottom member peripheral portion 30. The bottom member peripheral portion 30 can be defined by an upper and lower bottom end portions termed a bottom member lower end portion 31 and the bottom member upper end portion 32 as well as opposing side portions known as a bottom member right hand side portion 33 and a bottom member left hand side portion 34 respectively. The bottom member peripheral portion 30 may include a plurality of additional features, such as one or more buttons or switch features, such as volume buttons 99a, an on/off button 99b, an orientation switch 90, or sound transmission features, such as a microphone transmission port 61 or a speaker transmission port 60.

The microphone transmission port 61 includes an opening, e.g., a microphone inlet aperture that spans from an exterior of the bottom member 3 to an interior of the bottom member. An interior portion of the microphone inlet aperture can be covered by a microphone waterproof sealing layer that spans and covers the inlet aperture and functions to seal the microphone port aperture to prevent water from accessing the microphone of the device. The waterproof sealing layer can permit efficient transmission of sound waves into the housing and toward the microphone of the housed device. The waterproof sealing layer can cover the microphone inlet aperture and can be affixed to the bottom member 3 by any suitable means, such as by an adhesive, thermal coupling, and/or by overmolding in conjunction with forming the microphone transmission port 61. An exterior portion of the microphone transmission port 61 can include a microphone grille 61b that functions as a protective enforcement spanning at least a portion of the inlet aperture.

The bottom member 3 may additionally include a latch feature 70 that includes a latch door 71b that may be positioned so as to cover and enclose an electrical transmission port, such as charge port opening (not shown) on a corresponding top member 2. The latch feature 70 of this embodiment can be liquid-proof or dust proof and can include a gasket (not shown) to facilitate sealing. The bottom member 3 may include one or more accessory connection ports 97a, 97b, 97c, and 97d, which may be positioned anywhere on the bottom member 3, such as in the corners of the bottom perimeter portion 30 of the bottom member 3. The one or more accessory connection ports 97a, 97b, 97c, and 97d can be used for connecting one or more accessories to the protective housing 1. In certain embodiments, the bottom member surface 35 may additionally include a lens feature.

The bottom member 3 can include a bottom member surface 35. The bottom member surface 35 of the bottom member 3 can be composed of one or more materials that can be the same material or different materials and can be the same or different as the material or materials used in the bottom member peripheral portion 30. In certain embodiments, the bottom member surface 35 of the bottom member 3 can be comprised of at least one screen or membrane. In other instances, the bottom surface 35 of the bottom member 3 can be formed of a rigid or semi-rigid material, such as polycarbonate, nylon, Plexiglas, or the like. In another example, the bottom surface 35 of the bottom member 3 can be formed of a more semi-flexible material such as polypropylene or a rubber, such as, for example, a thermoplastic elastomer (TPE). Where a semi-rigid material is employed, the bottom surface may have a rigidity that is selected so as to allow the bottom surface to vibrate in such a manner that it amplifies the sound characteristics emitted from a speaker of a housed electronic device. In another example, the bottom surface 35 of the bottom member 3 can behave like a speaker diaphragm and can vibrate and thereby transmit sound energy received from a speaker of a housed electronic device through the bottom surface of the housing 1.

In accordance with a particular configuration of the protective housing 1, and as can be seen with respect to FIG. 1A, the top member 2 and a bottom member 3 may be configured for being removably coupled together so as to form the protective housing 1. The protective housing 1 can include one or more sets of clasping mechanisms (not shown) that are adapted for coupling the top member 2 and the bottom member 3 together. A substantially waterproof and/or shockproof seal can be formed between the top member 2 and the bottom member 3.

A water-resistant seal or a waterproof seal can be formed by coupling the top member 2 to the bottom member 3. The seal can prevent passage of liquid, e.g., water, from an exterior surface of the protective housing to an interior surface of the protective housing within a range of predetermined conditions. For instance, the seal can prevent water intrusion into the interior of the housing when the housing is submerged in water up to depths of about 1, 5, 10, 20, or 50 feet. In other instances, the seal can prevent water intrusion into the interior of the housing when the housing is submerged in water up to greater depths than those listed above.

The coupling mechanism(s) may have any suitable configuration so long as it is capable of participating in the coupling of one member of the protective housing to another member of the protective housing, such as the top member 2 to the bottom member 3. For example, in certain embodiments the coupling mechanism may function to produce a waterproof and/or shockproof seal. For instance, in certain instances, the coupling mechanism may include a clasping mechanism that may function to seal the top member and the bottom member together in a waterproof and/or shockproof seal. In certain instances the clasping mechanism may include an internal or external locking element, as described herein.

Figure 1B:
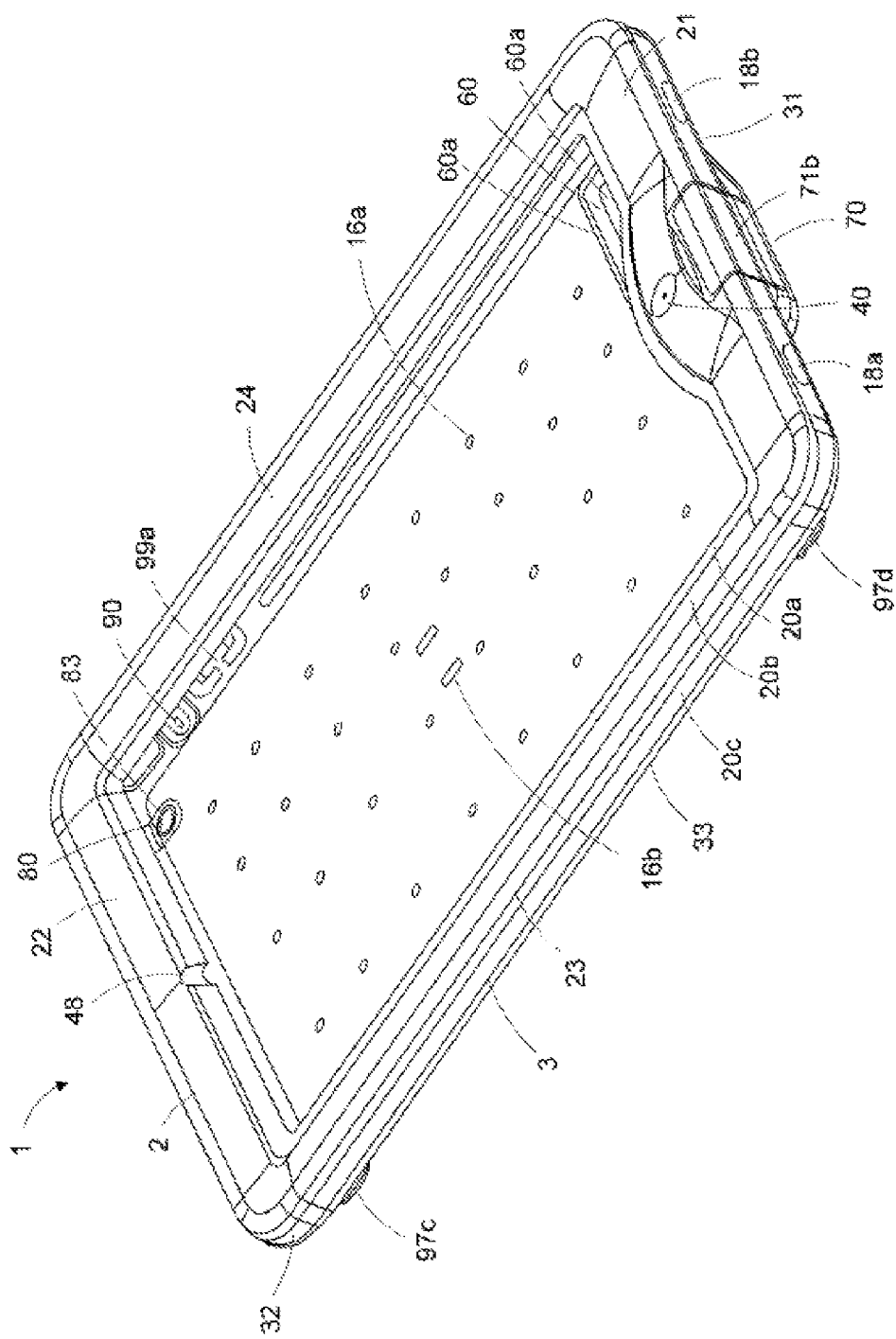

FIG. 1B provides a perspective front view of the protective housing 1 of FIG. 1A. Accordingly, in particular embodiments, the housing 1 may include a top member 2 and a bottom member 3 that when removably coupled together form the protective housing 1. As depicted in FIG. 1B, the top member 2 can include a peripheral portion 20, and in this embodiment, may not include a front surface member, such as a transparent membrane. Despite not having a front surface member covering the opening in the top member 2, the top member 2 can seal against a front surface of an electronic device to provide a substantially waterproof and/or water resistant seal when the top member 2 is coupled to the bottom member 3 to form the housing 1.

The top member peripheral portion 20 is defined by a lower top member end portion 21 and an upper top member end portions 22 as well as opposing top member right hand and left hand side portions 23 and 24 respectively. The top member peripheral portion 20 also includes a home button 40 that corresponds to a home button the electronic device. As depicted, the top member peripheral portion 20 is further defined by top member interior perimeter portion 20a, top member middle perimeter portion 20b, and top member exterior perimeter portion 20c. A proximity sensor opening 48 can be disposed in the top member interior perimeter portion 20a. The proximity sensor opening 48 can be configured as a cutout portion allowing a proximity sensor of an underlying housed device to determine the proximity of an object, such as a user.

The bottom member peripheral portion 30 is defined by a proximal and a distal bottom member end portions 31 and 32 as well as opposing bottom member right hand and left hand side portions 33 and 34 respectively. The bottom member includes a bottom member surface 35, which bottom surface 35 may have one or more risers, such as standoffs 16a and/or bridges 16b, which bridges 16b together may form a standoff channel, positioned on an interior portion of the bottom surface 35. The standoffs 16 may be configured to raise a housed device above the plane of the bottom member surface 35. In certain embodiments, the interior portion of the bottom member surface 35 do not have such standoffs, rather, the interior surface is substantially planar.

The bottom member surface 35 may also include a lens feature 80, which lens feature 80 includes an optical grade lens 83 that is positioned to align with a camera lens of a housed electronic device so as to enhance the photographic features of the housed electronic device.

The bottom member 3 may additionally include a bottom peripheral portion 30, wherein the peripheral portion includes an orientation control switch 90, a volume control element 99a, a liquid-proof latch cover 71b, and a sound transmission feature, like speaker transmission port 60. In this embodiment, the speaker port 60 is enclosed by a speaker waterproof seal (e.g., gasket) 60a that provides a seal that is waterproof but which also permits the transmission of sound from an electronic device outwards from the protective housing 1. The peripheral portion 30 of the protective housing 1 may additionally have one or more tool slot features 18a and 18b incorporated therein to allow the coupled top 2 and bottom 3 members of the protective housing 1 to be disengaged from one another and the housing 1 opened, for example with a tool, such as a screwdriver, coin, or the like when inserted into the slot feature(s) 18 between the top member 2 and the bottom member 3 and rotated or twisted.

In certain embodiments, the top and bottom members may be composed of various different components and therefore may be fabricated from a plurality of different materials. Suitable materials from which the top and bottom member may be fabricated include rigid, semi-rigid, semi-flexible, and flexible materials that may be fabricated together or separately and combined together so as to provide shock and/or liquid proof resistance to the protective housing. Such materials may include but are not hereby limited to plastics, polycarbonates, nylons, liquid crystal polymers, metals, and/or rubber, thermal plastic urethanes, polyethylenes, and/or polypropylenes, TPEs, mixtures thereof and the like. In certain embodiments, the materials may be a composite of materials and may include one or more reinforcing elements such as glass, ceramics, carbon fiber (e.g., graphite), and the like.

Figure 1C:
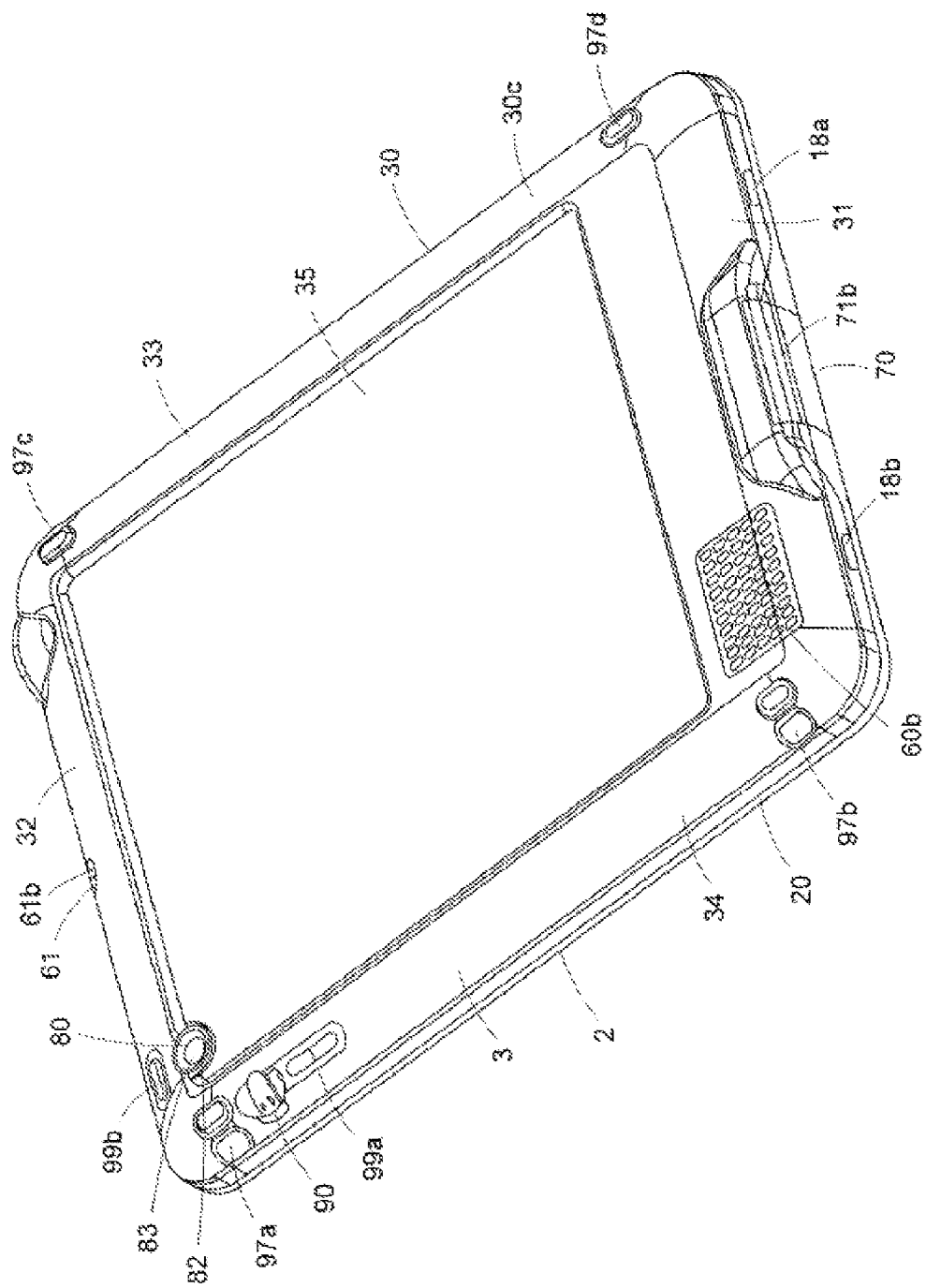

FIG. 1C is a perspective illustration of a top-down view of the bottom member 3 of the protective housing 1. Depicted are the bottom member back surface 35, peripheral portion 30 of the bottom member 3, as well as portions of the peripheral portion 20 of the top member 2. The bottom member perimeter 30 portion is defined by opposing proximal and distal bottom member end portions 31 and 32 and opposing bottom member right hand and left hand side portions 33 and 34 respectively. The bottom member peripheral portion 30 may further be defined by interior perimeter portion 30a (not shown), middle perimeter portion 30b (not shown), as well as exterior perimeter portion 30c.

The bottom member peripheral portion 30 includes an orientation switch 90, one or more button features such as volume switch 99 a, and on/off button 99b, as well as latch door 71b and tool slot features 18a and 18b. As depicted, the orientation switch 90, volume switch 99, on/off button feature 99b, and tool slot features 18a and 18b are positioned on the bottom member 3. The latch feature door 71b spans from the bottom member 3 to the top member 2. As depicted here, the orientation control switch 90 and volume control switch 99a are located on the bottom member left hand side member 34 and the on/off button feature 99b is located on the bottom member distal end portion 32.

A lens feature 80 including a camera lens 83 and optical skirt 82 is shown on the bottom member upper end portion 32 of the bottom member peripheral portion 30. A speaker grille 60b is depicted here on the bottom peripheral portion 30 of the bottom member 3 covering a portion of the lower bottom member end portion 31 of the bottom perimeter portion 30. A microphone transmission port having a microphone protective grille 61b is depicted here covering a portion of the upper bottom member end portion 31 of the bottom peripheral portion 30 of the bottom member 3. Also depicted are accessory connection ports 97a, 97b, 97c, and 97d, positioned on a bottom portion of the peripheral portion 30 of the bottom member 3. In other embodiments, one or more of the positions of various features described in FIG. 1C may be reversed or repositioned.

Figure 1D:
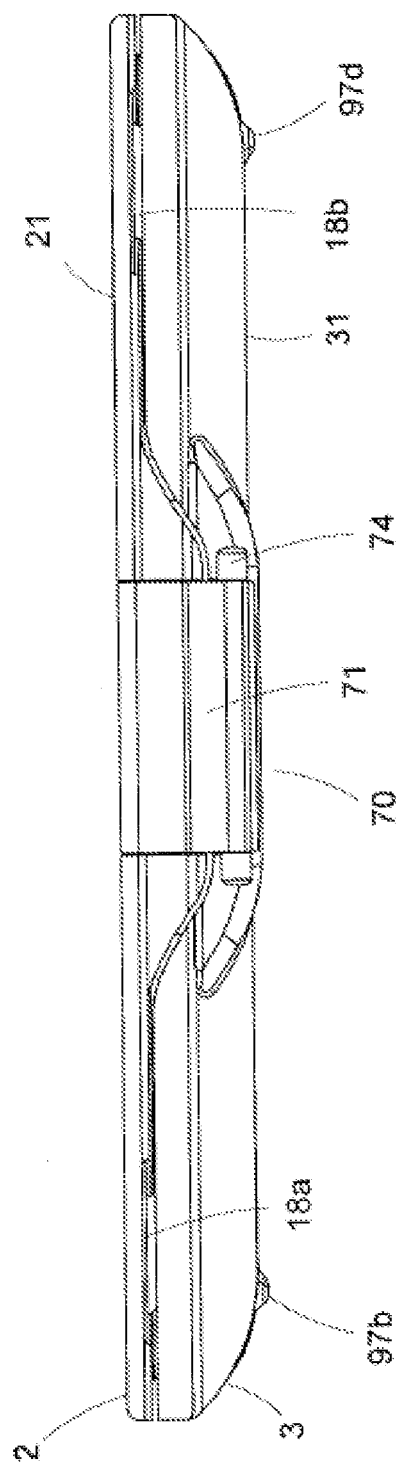

FIG. 1D provides a front view of the of the protective housing 1 showing the top member 2 looking toward the top member proximal end portion 21 and the bottom member 3 looking towards the bottom member proximal end portion 31. The latch door 71b and tool slot features 18a and 18b span from the bottom member 3 to the top member 2. The latch door axle 74 allows the latch door 71 to swing to open and closed positions about the axle 74.

Strap System

Figure 2:
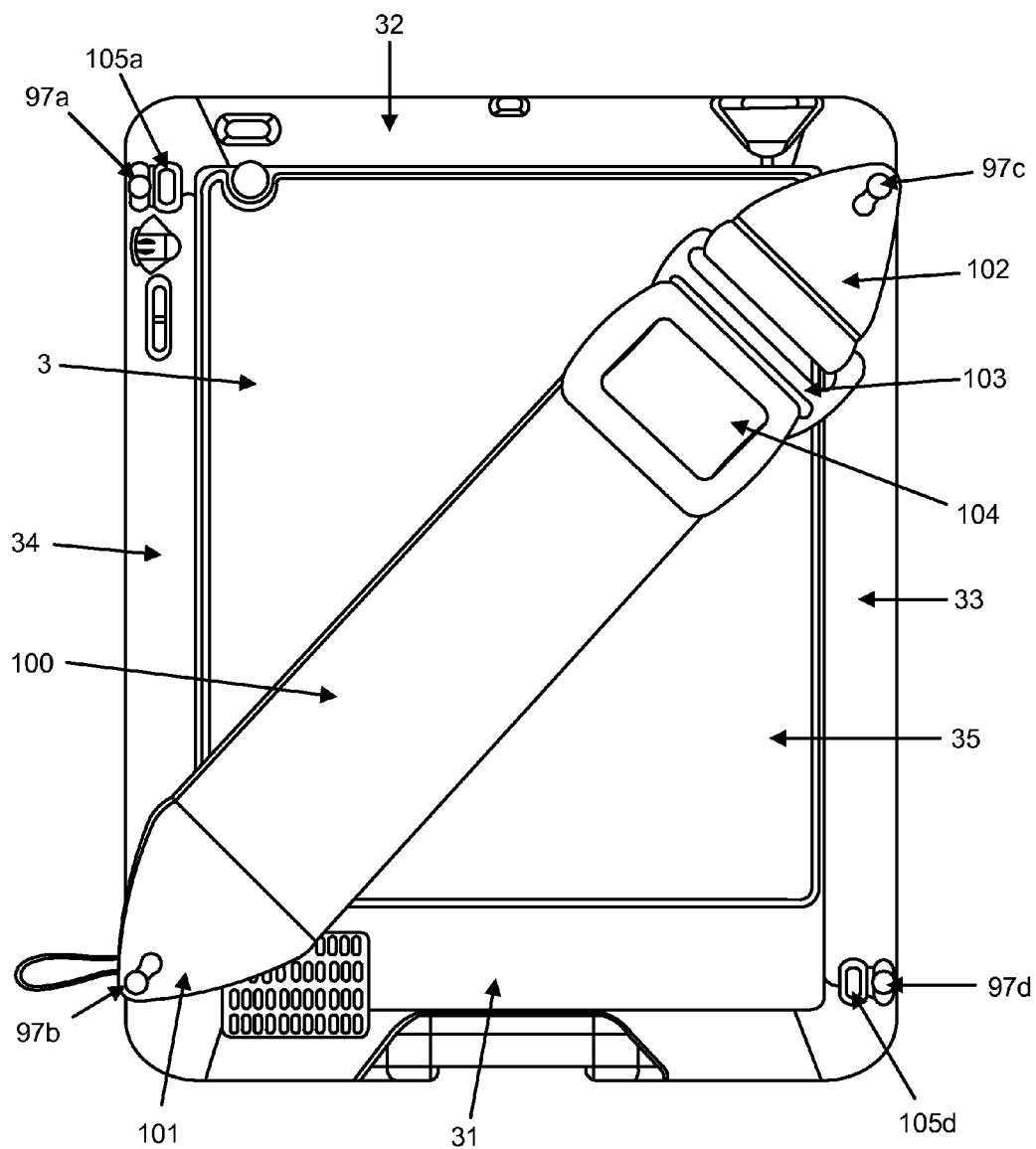
FIG. 2 provides a view of a strap system for a housing for a tablet computer.

The disclosure also provides a strap system for a housing, such as the housing shown in FIGS. 1A-1D. Generally, the strap system is attached to cross over the bottom member 3, as shown in FIG. 2. The strap system can include a single strap that passes diagonally, horizontally, or vertically across the bottom member 3 of the housing 1, where the bottom member 3 can serve to cover and protect a rear side of the electronic device. One example of a bottom member is provided in FIG. 1A as bottom member 3. The drawings are provided to show various configurations of the strap system on the housing depicted in FIG. 1A. However, these strap system configurations can be used on any housing for any electronic device by positioning the straps in an analogous way as the way demonstrated for the housing shown in FIG. 1A.

The single strap can pass diagonally from a first corner of the bottom member to a second corner of the bottom member. Alternately, the single strap can pass diagonally from a position between any two corners of the bottom perimeter portion 30 of the bottom member 3 to a third corner. Alternately, the single strap can pass diagonally from a first position between any two corners to a second position between any two corners. As shown in FIG. 2, the diagonal strap can pass from one corner of the bottom perimeter portion 30 of the bottom member 3 to the opposite corner on the bottom perimeter portion 30 of the bottom member 3.

The single strap can also pass substantially horizontally across the bottom member 3 of the housing. Horizontal here refers to passage from a bottom right hand side member 33 to a bottom left hand side member 34 at substantially the corresponding position. Thus, a horizontal strap would pass over the bottom right hand side member 33 at substantially the same distance from the bottom member lower end portion 32 as where the strap passes the bottom left hand side member 32. The horizontal strap can pass from corner to corner, from a position between two corners on the periphery of the bottom member 3 to a third corner, or from a first point located between two corners on the periphery of the bottom member 3 to a second point located between two corners on the periphery of the bottom member 3. In one embodiment, the horizontal strap can pass from one corner to another corner, thereby allowing the strap to attach to the bottom member of the device near its lower 31 and upper ends 32.

The single strap can also pass substantially vertically across the bottom member 3 of the housing 1. Vertical here refers to passage from a bottom member upper end portion 32 to a bottom lower end portion 34 at substantially the corresponding position. Thus, a vertical strap would pass over the bottom member upper end portion 32 at substantially the same distance from the right hand side member 33 as where the strap passes the bottom member lower end portion 31. As shown for the diagonal strap, the vertical strap can pass from corner to corner, from a position between two corners on the periphery of the bottom member 3 to a third corner, or from a first point located between two corners on the periphery of the bottom member 3 to a second point located between two corners on the periphery of the bottom member 3. In one embodiment, the vertical strap passes from one corner to another allowing the strap to cross the bottom member of the device near its right hand 33 or left hand side members 34.

A vertical or horizontal strap and some embodiments of diagonal straps can be used to carry the housing or tablet computer like a briefcase. In certain embodiments, an additional wrapping can be added to the strap to be used as a handle to carry the housing and/or tablet computer. In other embodiments, the handle can extend from the strap so that the handle is above the housing or tablet computer when it is carried. In this embodiment, it would not be necessary for the strap to be close to the end of the housing and/or tablet computer to be carried like a briefcase from the handle.

Any of the straps described herein can be lengthened in order to provide enough slack to carry the housing and/or tablet computer as a purse or messenger bag. The strap can be slung over one shoulder and carried on the same side of the body or slung over the other shoulder and carried on the opposite side of the body. The vertical, horizontal, or diagonal strap embodiments can be used to provide an over-the-shoulder carrying embodiment.

Each single strap may be a straight piece of flexible material. In other embodiments, the strap can be curved into a half circle or half ovular shape. In other embodiments, the strap could have a corner along its length. This corner could form an angle between about 10 and 170 degrees. In other embodiments, the corner could form an angle of 10, 20, 30, 40, 45, 50, 60, 70, 80, 90, 100, 110, 120, 130, 140, 150, 160, or 170 degrees.

The strap system can include multiple straps. For instance, the strap system can include a first strap that crosses over a second strap to form an "X" shape. These multiple straps can be connected to the housing 1 at the corners of the bottom member 3 or anywhere along its periphery. The multiple straps can also be arranged in parallel or arranged to pass over the bottom member and not cross. In certain embodiments, the multiple strap system can form a "V" shape. These multiple straps can also be connected to the housing at the corners of the bottom member 3 or anywhere along its periphery.

In one embodiment, there can be one strap that connects to the housing at three or more positions. In another embodiment, a single piece strap can connect to the housing at four positions forming an "X" shaped strap.

In certain embodiments, the strap system is connected to the bottom member 3 by one or more accessory connection ports (97a, 97b, 97c, and 97d) that can be positioned anywhere on the bottom member 3, such as in the corners of the bottom perimeter portion 30 of the bottom member 3. The one or more accessory connection ports 97a, 97b, 97c, and 97d can be used for connecting one or more accessories to the protective housing 1.

The strap system can be connected to the housing at any position on the housing that allows for manipulation or viewing of the electronic device. The strap system can be connected to the housing on the top right hand side portion 24, top left 23 hand side portions, top member lower end portion 21, or top member upper end portion 22. The strap system can also be attached to the top member peripheral portion 20.

The strap system can be connected at any of the accessory connection ports (e.g. 97a, 97b, 97c, and 97d) located on any portion of the housing described above. The strap can be attached to the accessory connection ports by any suitable method. For example, the strap can be attached to the accessory connection port via a hole in one end of the strap. The hole in the strap end can be configured to receive a post, and the post can have a button on top of the post. The button can be inserted through the hole in the strap. Once inserted through the hole, the button can serve as a retention mechanism to prevent the end of the strap from releasing from the post. In other examples, the strap can be attached via VELCRO®, via a hook on the strap that fits onto a hole or loop on the housing, or via a hole or loop on the strap that fits onto a hook on the housing. The strap can also be attached via a buttonhole on the strap is configured to attach to a button on the housing.

The straps can be made of any flexible material. In certain embodiments, the straps can be at least partially made of woven fabric. In other embodiments, the straps can be at least partially made of plastic or rubber. In certain embodiments, the straps can be made of any combination of materials.

The straps can include a size adjustor that allows the strap to be elongated or shortened as needed. The strap can also be formed by two pieces of fabric joined by a buckle. The buckle can have a prong that is inserted into a hole in one of the pieces of fabric that makes up the buckle. The buckle can also be a loop that allows a piece of fabric to be fed through it and folded back on itself, where it attaches to itself, for example, with VELCRO®.

FIG. 2 provides a bottom view of a housing containing a tablet computer with a strap as described above. The strap 100 is shown in a diagonal configuration attached to the upper right 97c and lower left 97b accessory connection ports. Of course, the opposite diagonal configuration from the upper left 97a to the lower right 97d accessory connection ports can also be used. Each of the accessory connection ports (e.g. 97a, 97b, 97c, and 97d) can include a post 108 with a button 109 extending beyond the bottom surface 35 of the housing 1, as shown in FIGS. 5A-C. To secure the strap to the housing, the strap end (e.g. 101, 102) can include a slit 107 that allows the strap end to fit over the button 109 of the posts 108 that extend from the accessory connection port 97b, as shown in FIGS. 5B-C.

The strap 100 can include a loop 103 that allows an end of the strap to pass through the loop and adhere to VELCRO® on its own surface, as shown in FIG. 2. This configuration of the strap 100 allows for the housing 1 and the table computer to be held by one hand of a user without slipping. For instance, this configuration allows the housing 1 and the tablet to be held when the user's hand is at their side and leaves the opposite hand free to interact with the tablet computer.

Connection pegs (e.g. 105a, 105d) are shown in FIG. 2. In certain embodiments, the connection pegs interact with connection ends within the housing in order to hold both the connection pegs (e.g. 105 *a, b, c, d*) and the connection ends (97a, b, c, d) together in the housing. In certain embodiments, the strap 100 can be attached to the housing at the connection pegs 105 *a, b, c, d*. For example, a post, hook, hole, loop, etc. can be attached to the exposed surface of the connection pegs 105 *a, b, c, d*, and the strap 100 can be attached to the housing through the pegs 105 *a, b, c, d*. In FIG. 2, connection pegs 105*b* and *d* are obscured by the strap.

Figure 3C:
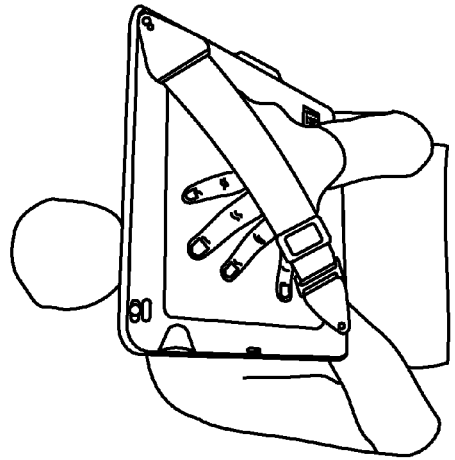
FIGS. 3A-F provide views of various configurations of strap systems for a housing for a tablet computer.
Figure 3F:
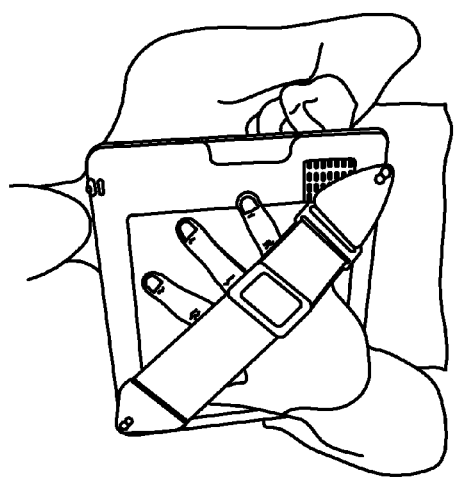
Figure 3B:
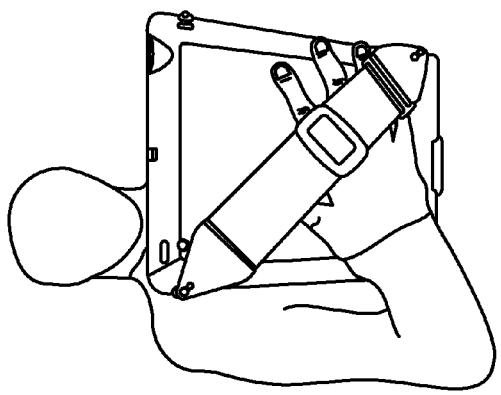
Figure 3E:
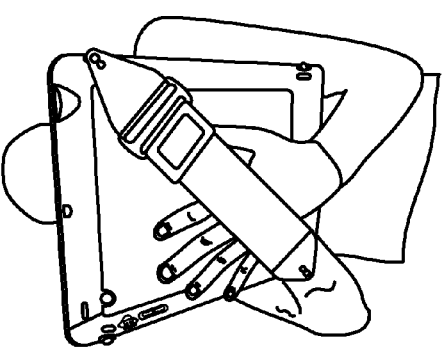
Figure 3A:
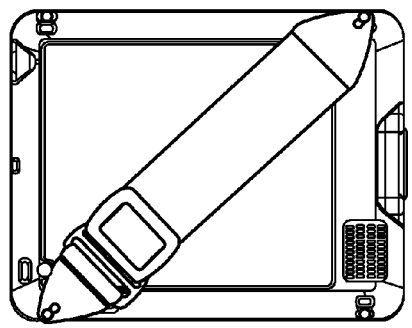
Figure 3D:
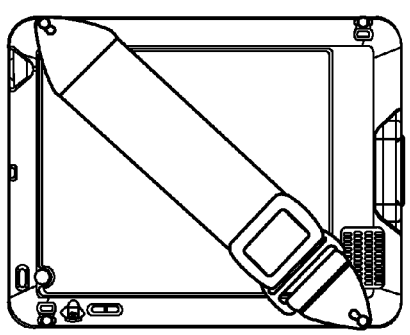

FIGS. 3A-F show various views of diagonal configurations and uses of the strap system. The configuration shown in FIG. 2 is replicated in FIGS. 3A and 3B with slight variations. This configuration is advantageous for using the tablet computer in portrait mode while typing with the left hand. When the strap is attached to the other connection ends, i.e. along the other diagonal, as shown in FIGS. 3C and 3D it is advantageous for using the tablet compute in portrait mode while typing with the right hand. Turning the tablet and inserting the hand through the strap so the strap covers the knuckles of the hand allows the tablet to be used in landscape mode. The tablet can be turned so that its left or right side is on top in landscape mode when either hand is holding the tablet or typing on the tablet.

Figure 4A:
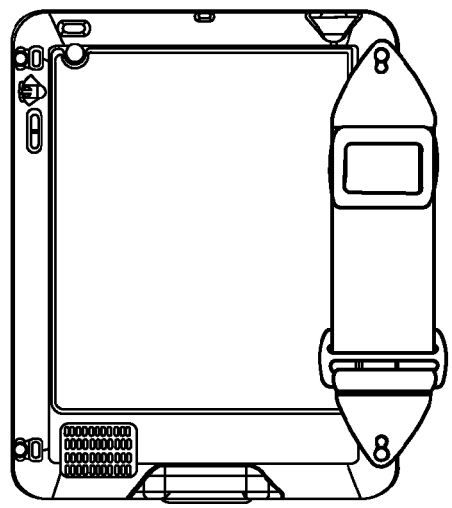
FIGS. 4A-D provide views of various configurations of strap systems for a housing for a tablet computer.
Figure 4B:
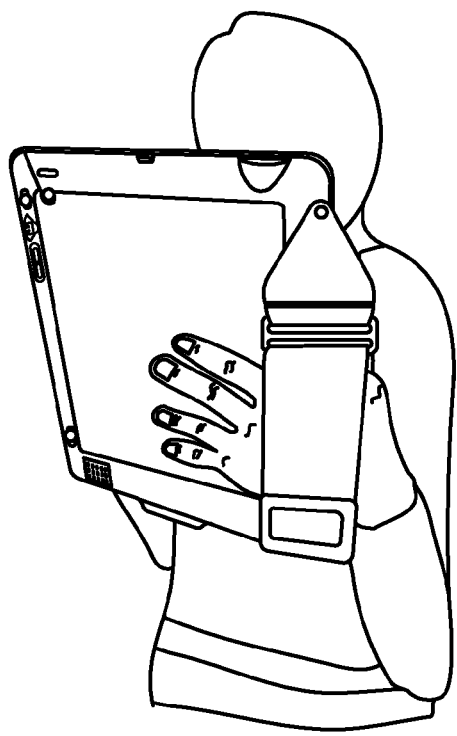
Figure 4C:
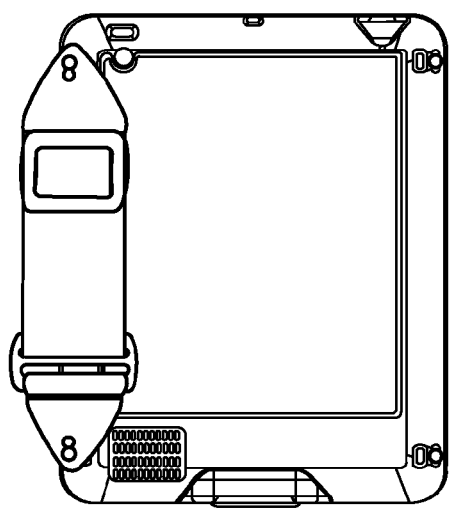
Figure 4D:
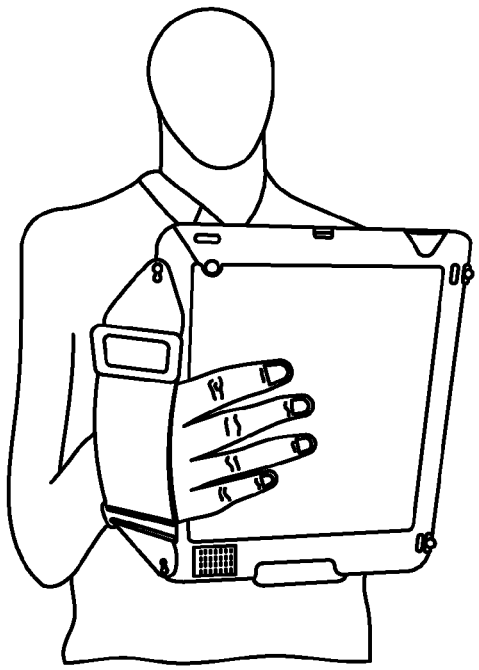

FIGS. 4A-D provide various views of the vertical configuration of the strap. FIG. 4A shows the strap covering the right hand side of the bottom member 33. This configuration is advantageous for holding the tablet computer with the left hand and interacting with the tablet with the right hand as shown in FIG. 4B. FIG. 4C shows the strap covering the left hand side of the bottom member 34. This configuration is advantageous for holding the tablet computer with the right hand and interacting with the tablet with the left hand as shown in FIG. 4D.

FIG. 5 shows one way of attaching the strap 100 to the housing. Here, the strap end 101 is attached to the connection end 97b at the lower left end of the housing. The connection end 97b has a post 108 with a button 109 on the end. The strap end 101 can have a keyhole mount having two overlapping holes. The keyhole mount can include a larger hole 107 having a larger diameter that allows a button 109 at the end of a post 108 to pass through it and a smaller hole 106 that is large enough to fit around the post 108 extending from the connection end 97b, but too small to fit over the button 109 at the top of the post. Thus, tension on the strap keeps the strap end 101 attached to the housing 1. FIG. 5A shows the strap 100 being attached to the connection end 97b through the larger hole 107 in the keyhole mount and FIG. 5B shows the strap after tension is applied so that the button is lined up with the smaller hole of the keyhole mount, thereby holding the strap end 101 in place. FIG. 5C shows a side view of the post 108 and button 109 that protrude from the connection end 97b in this embodiment.

Figure 6:
FIG. 6 provides a view of a strap system for a housing for a tablet computer.

FIG. 6 shows the strap 100 being tightened to hold the tablet computer against the left hand. The strap can pass through a loop 103 and adhere to VELCRO® on a top surface of the strap 100. Consequently, the strap can include an adjustable closure feature that allows the housing and the tablet computer to be held with one hand by users with a wide variety of hand sizes.

Figure 7C:
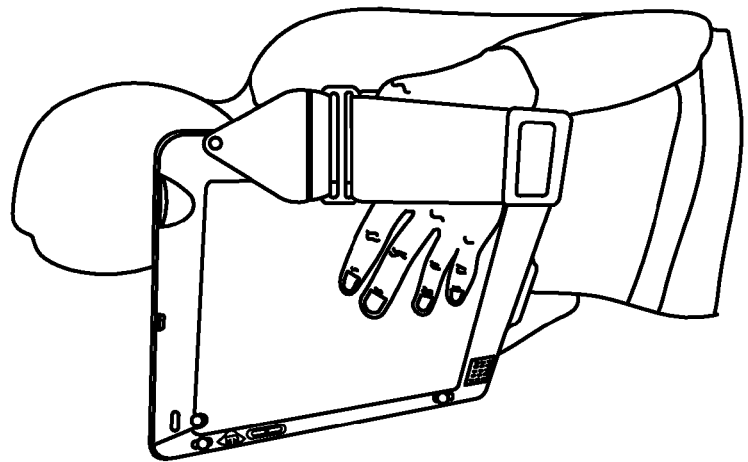
FIGS. 7A-C provide views of various configurations of strap systems for a housing for a tablet computer.
Figure 7B:
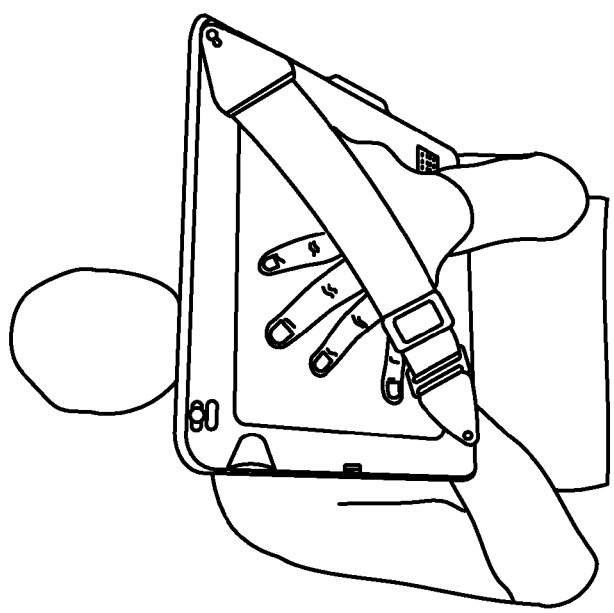
Figure 7A:
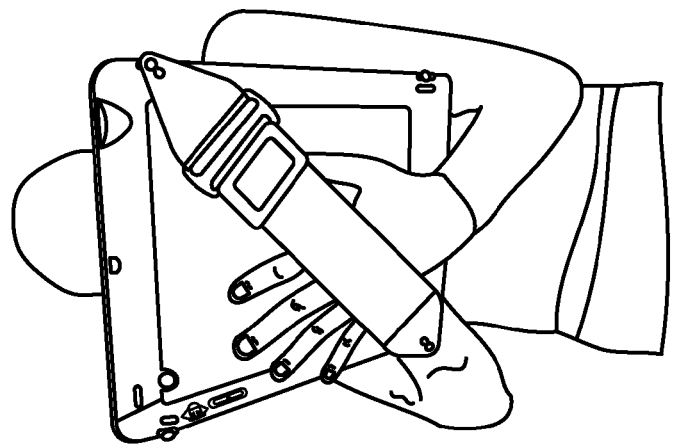

FIG. 7 provides embodiments of use of the strap 100 to secure the housing 1 and table to the left hand while using the right hand to interact with the tablet. FIG. 7A shows the diagonal configuration of the strap used with a portrait mode of the tablet. FIG. 7B shows the diagonal configuration of the strap used with a landscape mode of the tablet. FIG. 7C shows the vertical configuration of the strap used with a portrait mode of the tablet.

Figure 8C:
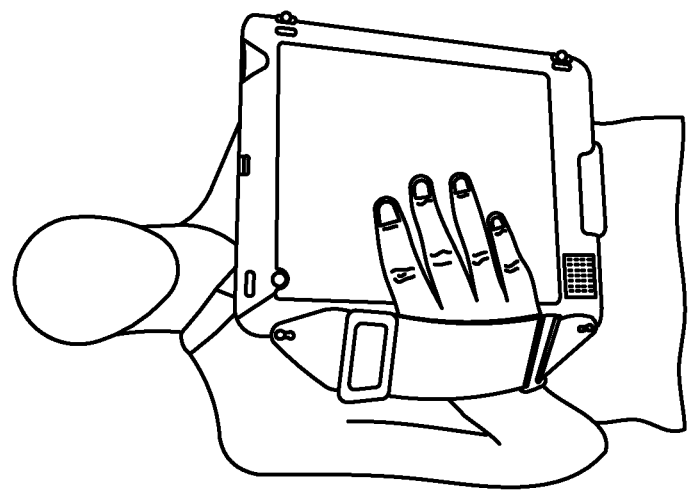
FIGS. 8A-C provide views of various configurations of strap systems for a housing for a tablet computer.
Figure 8B:
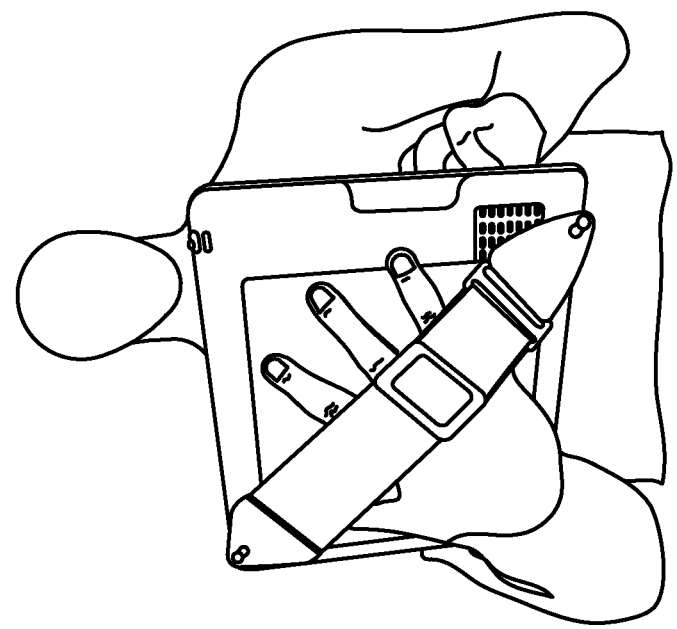
Figure 8A:
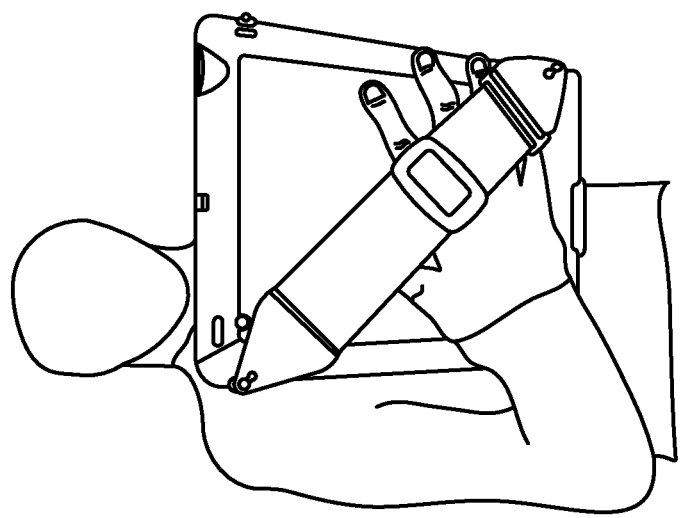

FIG. 8 provides embodiments of use of the strap 100 to secure the housing 1 and table to the right hand while using the left hand to interact with the tablet. FIG. 8A shows a diagonal configuration of the strap used with a portrait mode of the tablet. FIG. 8B shows the diagonal configuration of the strap used with a landscape mode of the tablet. FIG. 8C shows the vertical configuration of the strap used with a portrait mode of the tablet.

FIG. 9 shows that the strap can be tightened sufficiently such that the housing and tablet can still be held in the hand when the arm is at the side of a user. FIG. 9A shows this use of the strap in the diagonal configuration, and FIG. 9B shows this for the vertical configuration.

FIG. 10 shows a specific embodiment of a strap that could be used in any configuration, although it is shown in the diagonal configuration. The strap contains a pocket 110 that is closable with a zipper 111. As shown in FIG. 10A, the pocket 110 can be located on an outside portion of the strap, so it is easily accessible while holding the housing and tablet. The zipper 111, as shown in FIG. 10B, can have a zipper pull 115 attached to the zipper head for easy manipulation. The zipper 111 can include a zipper garage 114, which can include a fabric sleeve to receive the zipper head and/or zipper pull, thereby preventing inadvertent unzipping of the pocket and/or preventing the zipper head or zipper pull from contacting a user's arm and causing discomfort or being a nuisance. The pocket 110 can be large enough to hold one or more credit cards 112, identification cards, cash, or other small items, as shown in FIG. 10C. The pocket 110 can include one or more dividers 113, similar to a traditional wallet.

Figure 11:
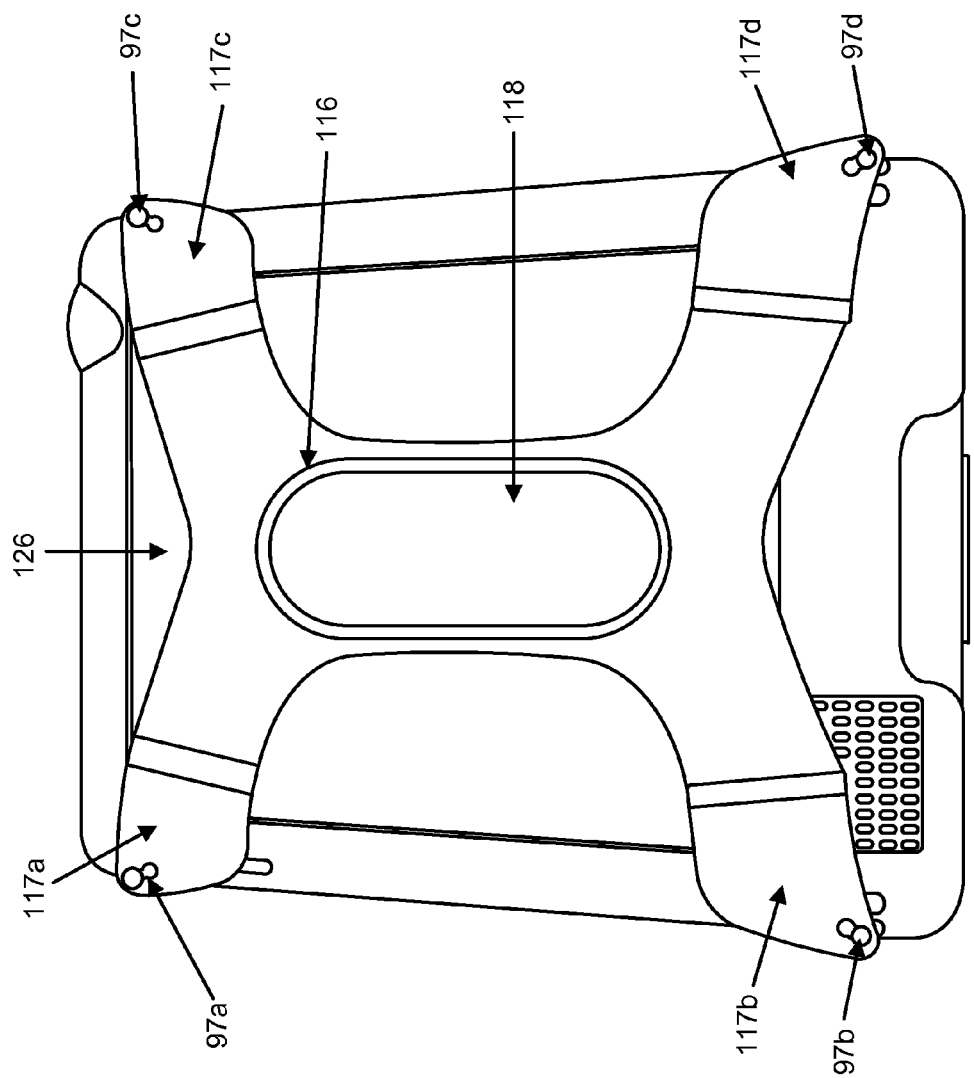
FIG. 11 provides a view of a strap system for a tablet computer or a housing for a tablet computer.

FIG. 11 shows a single "X" shaped strap that attaches to the housing 1 at all four connection ends 97a, b, c, and d. Each of the strap ends (e.g. 117a, b, c and d) can include a contain keyhole mount as shown in FIGS. 5A-C and described above. The strap ends (117a, b, c, and d) can be removably attached to each of the four corners of the housing. The strap can include a central handle region 118 that is attached to each of the strap ends 117a, b, c, and d. The strap can be positioned so that it is parallel with the right side 33 and left side 34 of the bottom member 3 of the housing and perpendicular to the upper end 32 and lower end 31 of the bottom member 3 of the housing. The handle 118 can be sufficiently large to permit a hand to be inserted under the handle to hold the housing and device. The handle 118 can be positioned so it is parallel to the upper end 32 and lower end 31 of the bottom member 3 of the housing instead of the right side 33 and left side 34. The handle 118 can be between 4 and 10 inches long. In other embodiments, the handle can be 5-9 or 6-8 inches long. In other embodiments, the handle can be 4, 5, 6, 7, 8, 9 or 10 inches long. In one embodiment, the strap ends (117a, b, c and d) can connect to either end of the handle region 118, thereby not requiring one specific orientation for attachment. In certain embodiments, two ends of the strap 117 are connected to each end of the handle region 118. For example, strap ends (117a, 117c) are attached to a first end of the handle region 118 and ends 117b and d are connected to a second end of the handle region.

FIG. 11 shows the region where the first end of the handle region 118 meets the strap ends 117a and c. At this region, there are two lines that form an angle. This angle can be between 90 and 180 degrees in various embodiments. In certain embodiments, the angle is between 120 and 180 degrees, between 130 and 170 degrees, between 140 and 160 degrees, or between 150 and 160 degrees. The angle can be about 91, 100, 110, 120, 130, 140, 150, 160, 170, or 180 degrees.

Figure 12B:
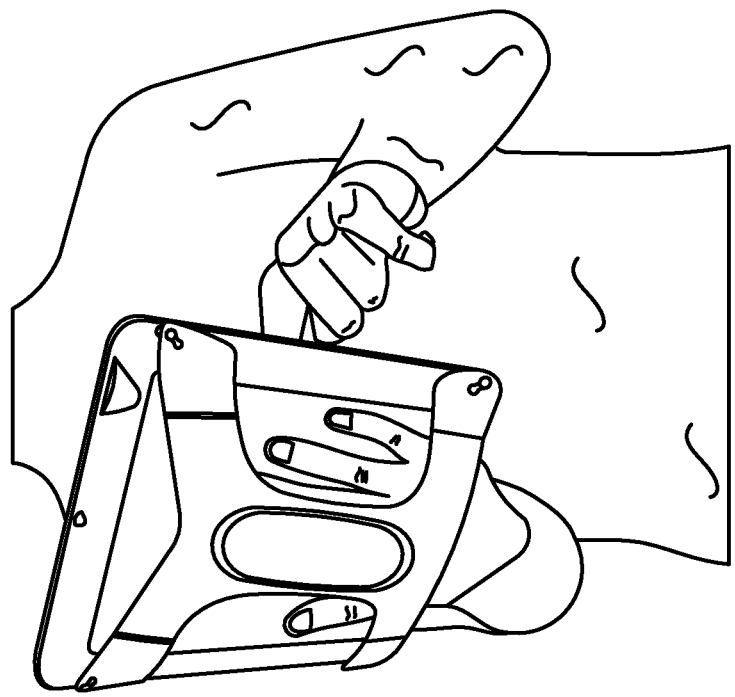
FIGS. 12A-B provide views of various configurations of strap systems for a tablet computer or a housing for a tablet computer.
Figure 12A:
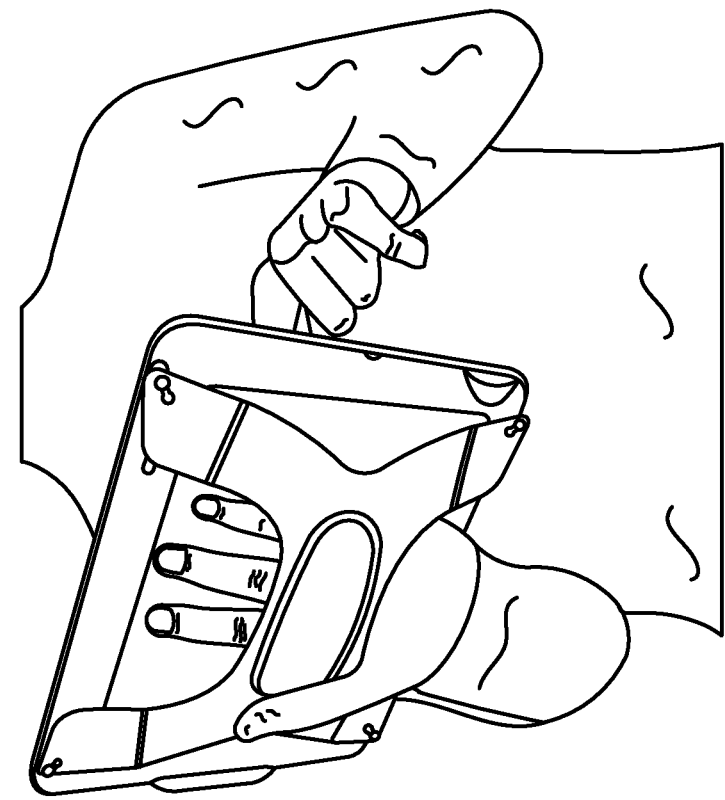

FIG. 12 shows the use of this X strap. It allows the device to be held with either hand in either landscape or portrait orientations without repositioning the strap. FIG. 12A shows the device being held in a landscape orientation, and FIG. 12B shows the device being held in a portrait orientation.

The disclosure also provides connection ends and connection pegs for connecting the straps described above to the housing described herein. The connection ends and connection pegs can be placed in connection apertures that pass through the housing. The connection ends can pass through connection end apertures, and the connection pegs can pass through connection peg apertures. The connection end aperture and the connection peg aperture can intersect inside the housing 1, and this intersection permits a connection peg to engage a connection end if the connection peg and the connection end are inserted into the connection peg aperture and connection end aperture, respectively.

FIG. 13 shows examples of connection ends and connection pegs inserted into a housing 1 for a tablet computer. In this example, the connection ends and connection pegs do not include additional hardware to connect them to the straps described above. Instead, the connection ends and connection pegs in this example serve as placeholders to occupy the apertures in the housing when a strap system is not attached. FIG. 13A shows the upper left corner of the housing. FIG. 13B shows the lower left corner of the housing. FIG. 13C shows the upper right corner of the housing. FIG. 13D shows the lower right corner of the housing. Each corner contains a connection end (e.g. 97a, 97b, 97c, 97d) and a connection peg (e.g. 105a, 105b, 105c, 105d). Each connection peg can include a tab or other suitable feature that allows the connection peg to be more easily removed from the housing.

Figure 13C:
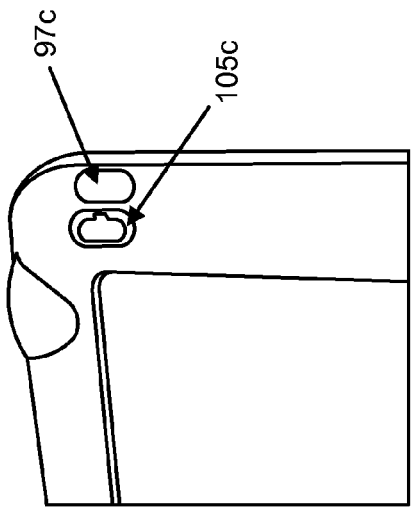
FIGS. 13A-D provide views of connectors for a strap system to attach to a housing for a tablet computer.
Figure 13D:
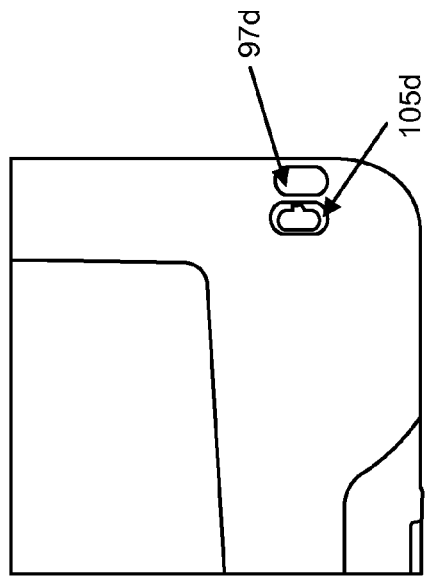
Figure 13A:
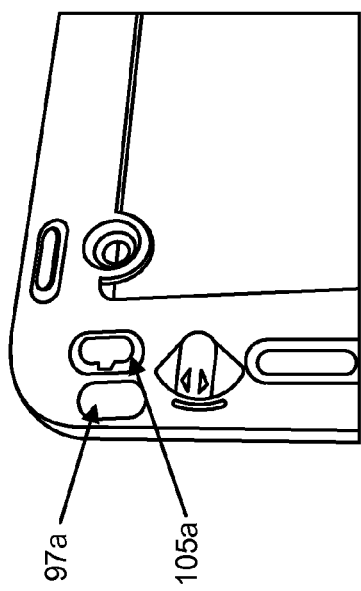
Figure 13B:
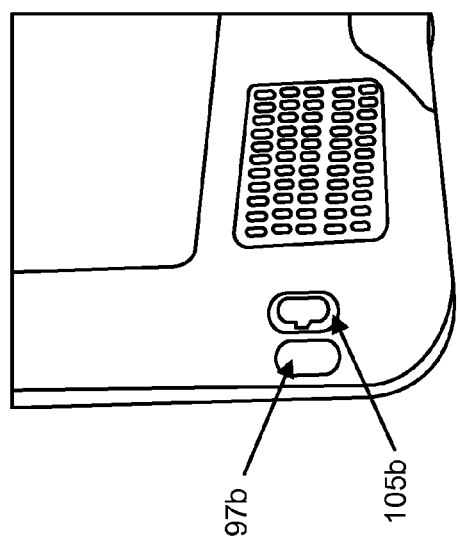

FIG. 14 shows a number of views of the connection ends and connection pegs removed from the housing. FIG. 14A shows the connection end 97 and the connection peg 105 with their distal ends facing each other. FIG. 14B shows the connection end 97 and connection peg 105 with their distal ends facing forward. In this figure, the internal slot 122 of the connection end 97 and the internal tab 123 of the connection peg 105 can be seen. Also shown is the external tab 121 on the connection peg 105, which allows the connection peg to be more easily removed from the housing. FIG. 14C shows the connection end 97 and the connection peg 105 with their proximal ends facing forward. The proximal end 119 of the connection end 97 and the proximal end 120 of the connection peg 105 are shown. The proximal end 119 of the connection end 97 and the proximal end 120 of the connection peg 105 are visible when the connection end and connection peg are inserted into their respective apertures, as shown in FIG. 13C. The external tab 121 of the connection peg 105 can also be seen in this figure. FIG. 14D shows the connection end 97 and the connection peg 105 with their distal ends facing forward. In FIG. 14 D, the connection end 97 and the connection peg 105 have been flipped over with respect to the view shown in FIG. 14B. The internal slot 122 of the connection end 97 and the internal tab 123 of the connection peg 105 are shown.

Figure 15B:
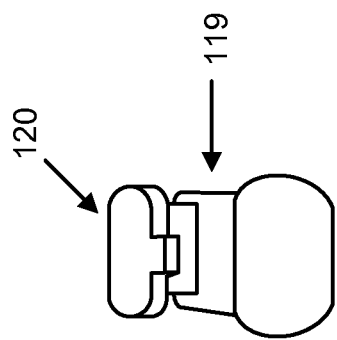
FIGS. 15A-B provide views of connectors for a strap system to attach to a housing for a tablet computer.
Figure 15A:
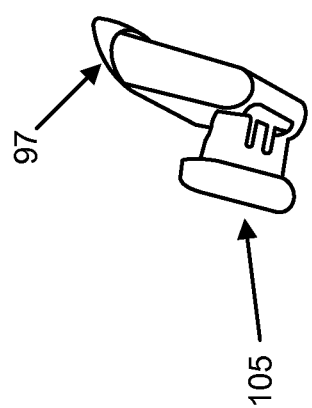

FIGS. 15A-B show the connection end 97 and the connection peg 105. FIG. 15A shows a side view of the joined connection end 97 and connection peg 105. The internal tab 123 of the connection peg 105 is inserted into the internal slot 122 of the connection end 97. FIG. 15B shows another view of the joined connection end 97 and connection peg 105. This view shows the proximal ends of the connection end 119 and of the connection peg 120.

Figure 16B:
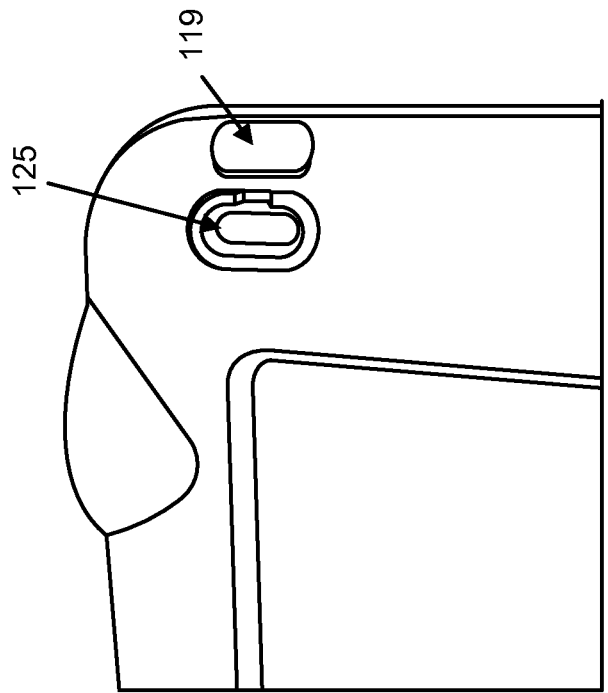
FIGS. 16A-B provide views of connectors for a strap system to attach to a housing for a tablet computer.
Figure 16A:
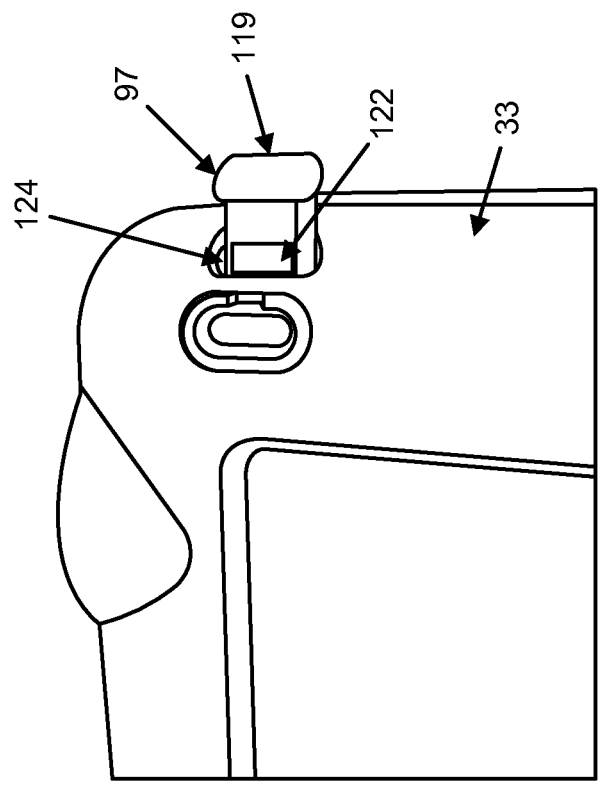

FIGS. 16A and 16B depict two stages of assembly. FIG. 16A shows the connection end 97 partially inserted into its connection end aperture 124 on the upper right side 33 of the bottom member 3. FIG. 16A shows the proximal end 119 and the internal slot 122 of the connection end 97. FIG. 16B shows the connection end 97 completely inserted into the connection end aperture 124. In FIG. 16A, all that is showing is the proximal end 119 of the connection end 97. The connection peg aperture 125 for the connection peg 125 is unoccupied. To lock the connection end 97 into the housing, the connection peg 105 can be inserted into the connection peg aperture 125. In doing so, the internal tab 123 (which can include one or more tines) of the connection peg 105 can be inserted into the internal slot 122 of the connection end 97, thereby locking the connection peg and connection end to each other within the housing.

Figure 24A:
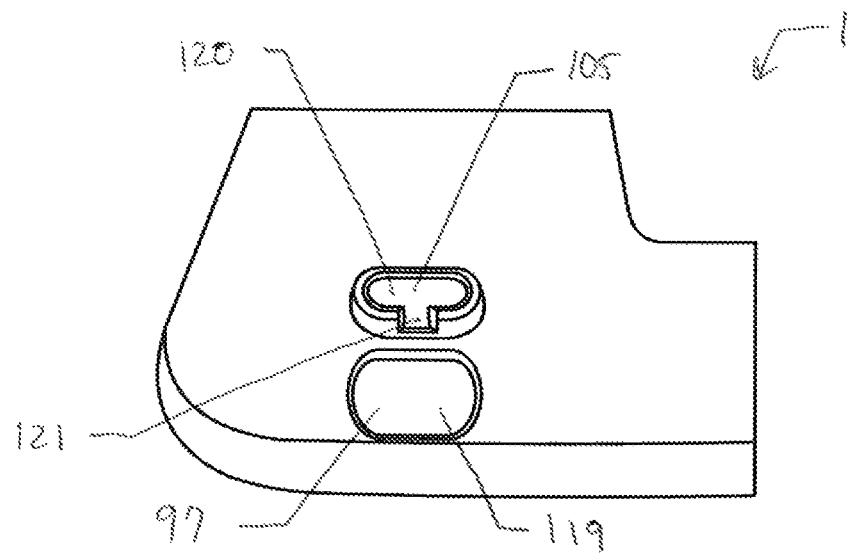
FIG. 24A shows a placeholder connection end and connector peg inserted into corresponding apertures in a housing for a tablet computer.

FIG. 24A shows a placeholder connection end 97 and connector peg 105 inserted into corresponding apertures in a housing 1. Specifically, the connection end 97 is inserted into the connection end aperture 124, and the connection peg 105 is inserted into the connection peg aperture 125. Upon insertion of the placeholder connection end 97, the proximal end 119 of the connection end is visible and can be relatively flush with the bottom surface 35 of the bottom member 3. In this way, the placeholder connection end 97 can occupy the connection end aperture 124 when a strap system is not being utilized to provide an improved appearance and feel.

Figure 24B:
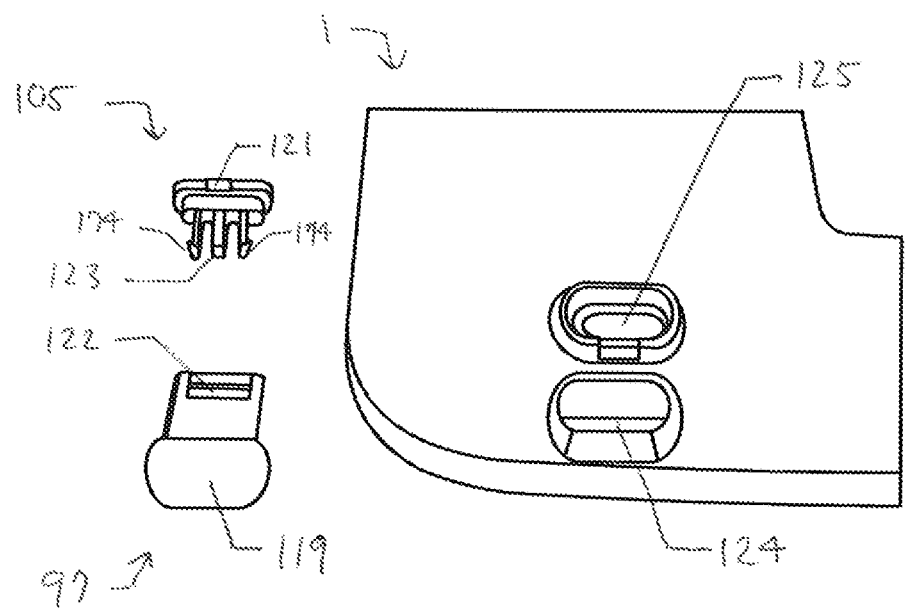
FIG. 24B shows a placeholder connection end and connection peg removed from a housing thereby exposing a connection end aperture and a connection peg aperture in the housing.

FIG. 24B shows the placeholder connection end 97 and connection peg 105 removed from the housing 1, thereby exposing the connection end aperture 124 and a connection peg aperture 125 in the housing. The connection peg 105 can include an external tab 121 that allows a user to pry the connection peg from the housing with a finger or a tool, such as a flathead screwdriver. The connection peg 105 can include an internal tab 123 that is configured to fit within an internal slot 123 in the connection end 97. Upon insertion, the internal tab 123 can interlock with the internal slot 122. In one example, shown in FIG. 24B, the internal tab 123 can include one or more tines 174 configured to engage one or more features of the internal slot 122.

FIGS. 25A-B show a front perspective view and a front view, respectively, of a connection end 97 with a post 108 extending therefrom and a button 109 attached to an end of the post. The button is one type of attachment feature. In FIGS. 25A-B, the connection end 97 has holes to accommodate a second attachment feature, such as a loop. Either of the attachment features (e.g. button or loop) can be connected to a strap end as part of a strap system for carrying the housing. For instance, the button 109 can be attached to a strap end 101 as shown in FIG. 5. Alternately, the loop 173 can be attached to a strap end 101 by any suitable fastening method, such as tying, stitching, clamping, gluing, buttoning, knotting, etc.

Figure 25D:
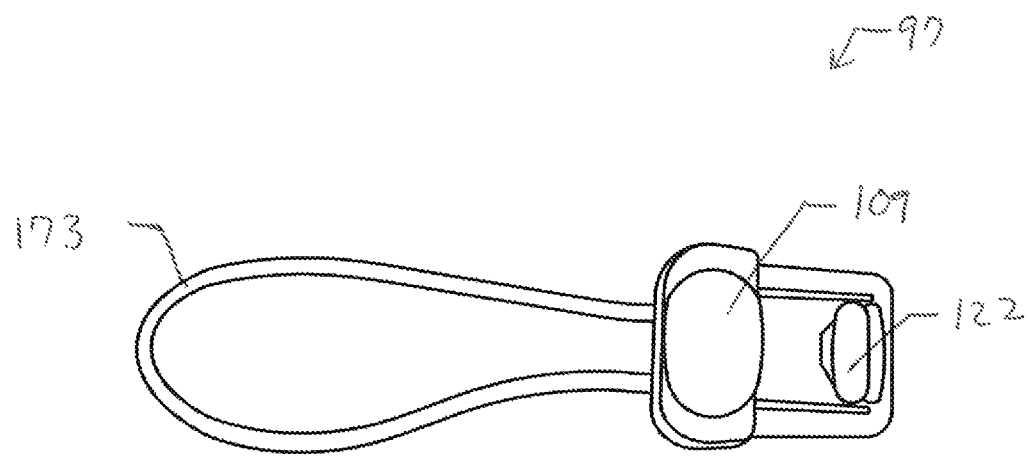
FIG. 25D shows a top view of a connection end with a button and with a loop extending from the connection end.
Figure 25E:
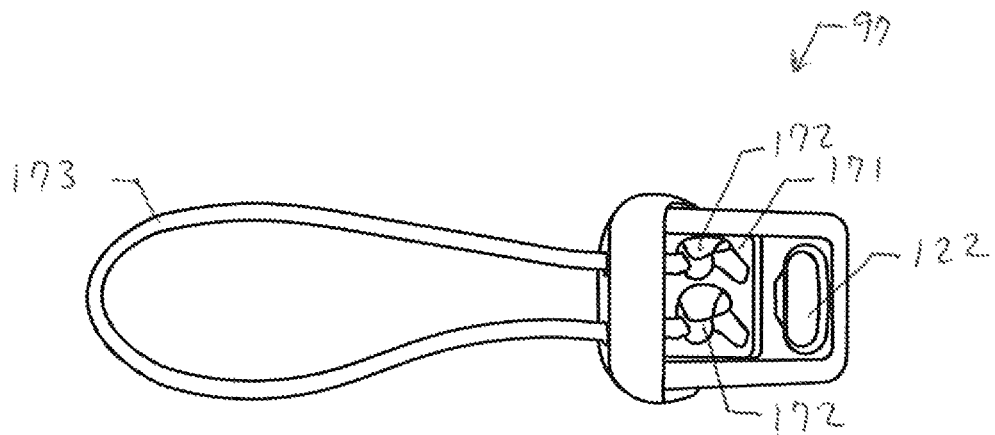
FIG. 25E shows a bottom view of a connection end with a loop extending from the connection end and knotted ends of the loop stored in a recess in the connection end.

FIG. 25C shows a bottom view of the connection end 97 showing the internal slot 122 and a recess 171 configured to receive and conceal knotted ends of a loop, if a loop were attached. FIG. 25D shows a top view of the connection end 97 with a loop 173 extending from the connection end. The loop 173 can be made from any suitable material, such as natural fibers, synthetic fibers, braided metal strands, rubber, or polymer. FIG. 25E shows a bottom view of the connection end 97 with the loop 173 extending from thru holes 176 in the connection end and knotted ends 172 of the loop stored in the recess 171 in the connection end.

Figure 26A:
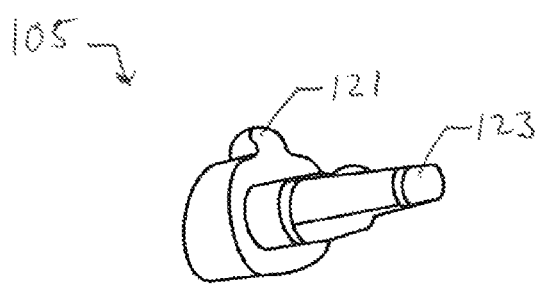
FIGS. 26A-B show side views of a connection peg.
Figure 26B:
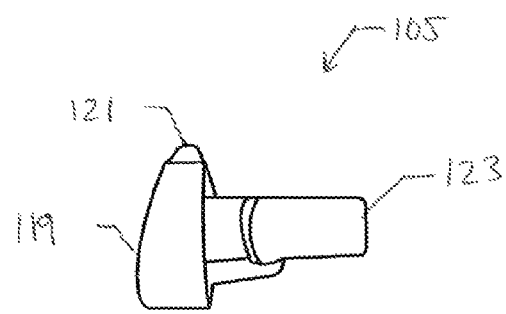
Figure 26C:
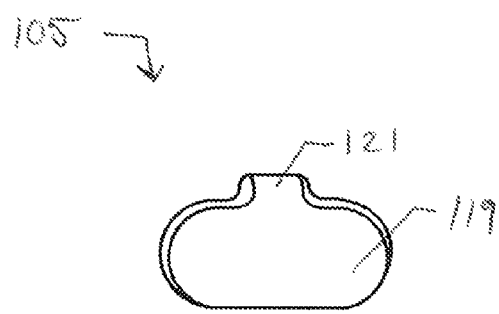
FIG. 26C shows a front view of a connection peg.
Figure 26D:
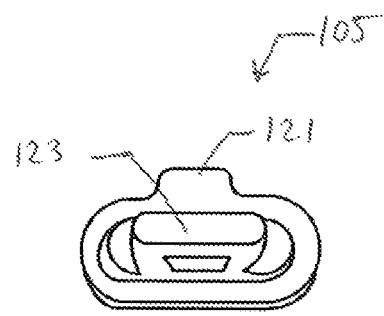
FIG. 26D shows a rear view of a connection peg.

FIGS. 26A-B show a side perspective view and a side view, respectively, of a connection peg 105. FIG. 26C shows a front view of the connection peg 105 displaying a proximal end 119 of the connection peg 105, and FIG. 26D shows a rear view of the connection peg, displaying the internal tab 123 and external tab 121.

Figure 27:
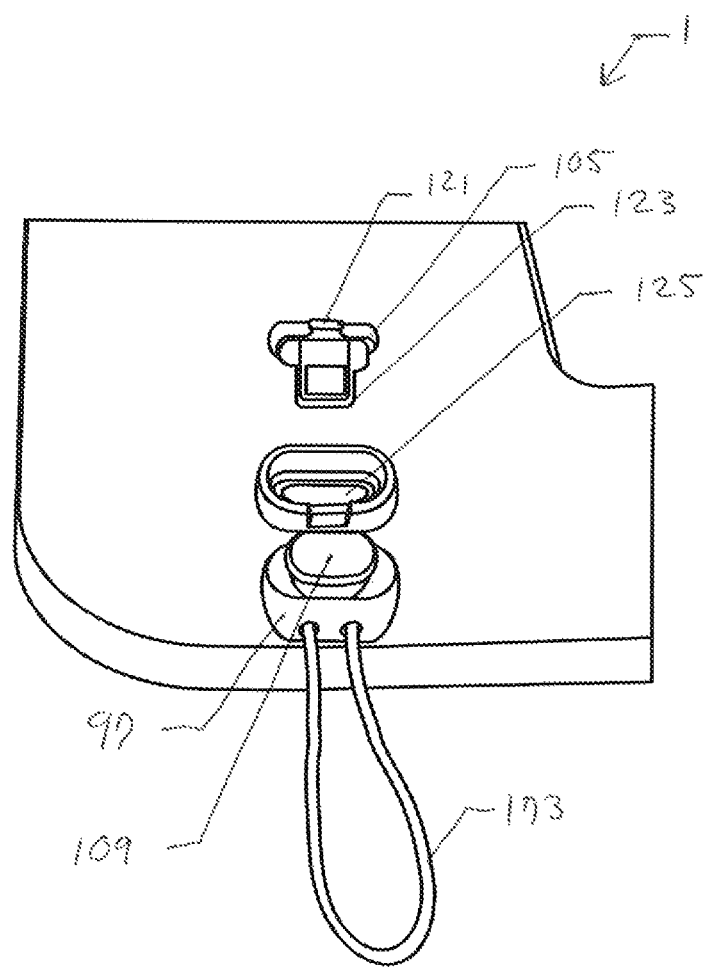
FIG. 27 shows a connection end inserted into an opening in a housing, where a loop is attached to the connection end and a connection peg is located near its insertion point in the housing.

FIG. 27 shows a connection end 97 inserted into a connection end aperture 124 in a housing 1. The attachment feature, which in this example is a loop 173, is attached to the connection end 97. The connection peg 105 is located near its point of insertion (i.e. the connection peg aperture 125) in the housing 1. To complete the assembly of the system, the connection peg 105 can be inserted into the connection peg aperture 125 and pressed down firmly to force the internal tab 123 of the connection peg to interlock with the internal slot 122 of the connection end 97. To disassemble the system, a user can pry the connection peg 105 from the connection peg aperture 125 by applying a prying force to the external tab 121. The user can then remove the connection end 97 from the connection end aperture 124. If the user desires to plug the apertures (124, 125) to provide a clean appearance, the user can first insert a placeholder connection end 97, such as the one shown in FIG. 16A, into the connection end aperture 124, and can then insert the connection peg 105 into the connection peg aperture 125.

An apparatus for carrying an electronic device can include a housing 1 configured to receive an electronic device. The housing 1 can include a first connection end aperture 124 intersecting with a first connection peg aperture 125, and a second connection end aperture 124 intersecting with a second connection peg aperture 125. The apparatus can include a first connection end 97 disposed within the first connection end aperture 124 and a first connection peg 105 disposed within the first connection peg aperture 125. An internal tab 123 of the first connection peg 105 can be inserted into an internal slot 122 of the first connection end 97 to interlock the first connection peg 105 to the first connection end 97. The first connection end 97 can include a first attachment feature (e.g. 109, 173, etc.) that is exposed when the first connection end is disposed within the first connection end aperture 124. The apparatus can include a second connection end 97 disposed within the second connection end aperture 124 and a second connection peg 105 disposed within the second connection peg aperture 125. An internal tab 123 of the second connection peg 105 can be inserted into an internal slot 122 of the second connection end 97 to interlock the second connection peg 105 to the second connection end 97. The second connection end 97 can include a second attachment feature (e.g. 109, 173, etc.) that is exposed when the second connection end 97 is disposed within the second connection end aperture 124. The apparatus can include a strap 100 having a first end 101 and a second end 102. The first end 101 can be attached to the first attachment feature (e.g. 109, 173, etc.) of the first connection end 97, and the second end 102 can be attached to the second attachment feature (e.g. 109, 173, etc.) of the second connection end 97.

Stand

The disclosure also provides a stand to be used with a housing enclosing a tablet computer or a tablet computer alone. One example of a housing for a table computer is described above and in FIG. 1. The stand is approximately the same size as a housing or tablet computer so that it can be fitted over the screen of the housing or tablet computer when not in use. The stand fits over the screen, held in place by tabs on each side of the stand. The tabs hold the stand in place over the screen of the housing or the tablet computer when not in use. This allows the stand to be easily transported when not in use and protects the screen of the housing and/or tablet computer.

The stand has two height settings that can be used with the housing or tablet computer. The first setting is for watching the screen of the tablet computer. The tablet computer with or without a housing is held by the stand at an angle that the screen can easily be watched without having to hold the housing or tablet computer. This angle between a flat surface upon which the stand is placed and the stand where the housing or tablet is placed is between 30 and 89 degrees. In other embodiments, the angle is between 30 and 40, between 40 and 50, between 50 and 60, between 60 and 70, between 70 and 80 or between 80 and 89. In other embodiments, the angle is about 30, 40, 45, 50, 60, 70, 80 or 89 degrees.

The second setting is for typing on the tablet computer when it is either contained within a housing or not. The stand holds the tablet computer at an angle that is comfortable for typing. This angle between a flat surface upon which the stand is placed and the stand where the housing or tablet is placed is between 5 and 40 degrees. In other embodiments, the angle is between 5 and 10, between 10 and 20, between 20 and 30 or between 30 and 40 degrees. In other embodiments, the angle is about 5, 10, 20, 30 or 40 degrees.

FIG. 17 shows various views of the stand when it is positioned over the screen opening on a housing for a tablet computer. The stand could also be made in a size that would fit directly on the tablet computer. FIG. 17A shows a view of the front of the housing. The stand 126 is fitted over the screen. There is a cut out 129 on the lower side of the stand 126 that allows access to a button 40 on the distal top member 21 of the housing. The top surface of the stand 127 is smooth and translucent. However, this surface 127 could be opaque and could be any color. The folding member 128 can be seen through the translucent surface 127. The folding member includes a large folding member 134 and a small folding member 135. These enable the stand to be positioned at two different heights, one for reading or watching the tablet computer and the other for typing on the tablet computer. The sides of the stand wrap around the right 20 and left 23 sides of the top member.

Figure 17B:
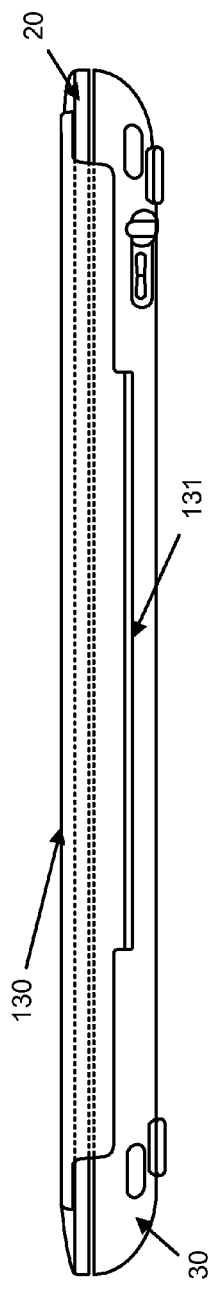
Figure 17C:
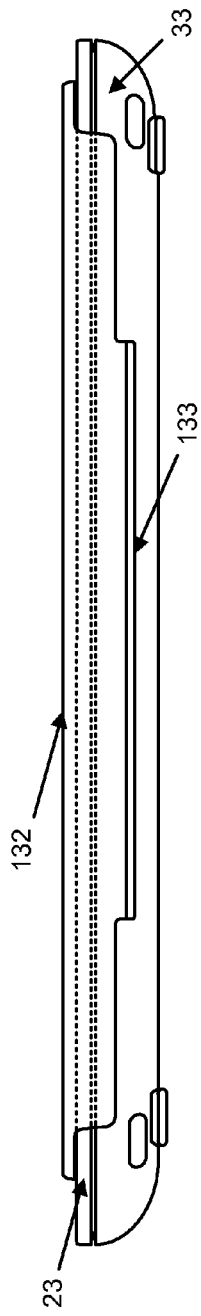

The mechanism for holding the stand to the housing or in certain embodiments, the tablet computer itself can be more clearly seen in FIGS. 17B and C. FIG. 17B shows the right side of the housing. The right side of the stand 126 has two portions, the side protector 130 which covers the right side of the top member 20 of the housing and the side tab 131 which wraps around the bottom member of the housing 30, holding the stand 126 in place. FIG. 17C shows the corresponding parts for the left side of the housing.

Figure 17D:
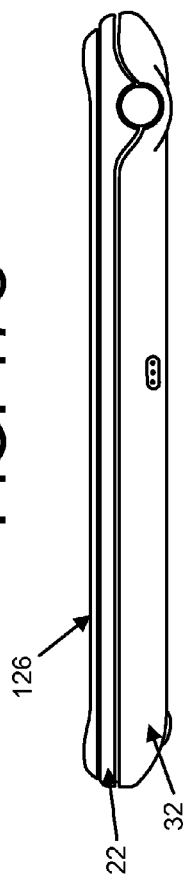
Figure 17E:
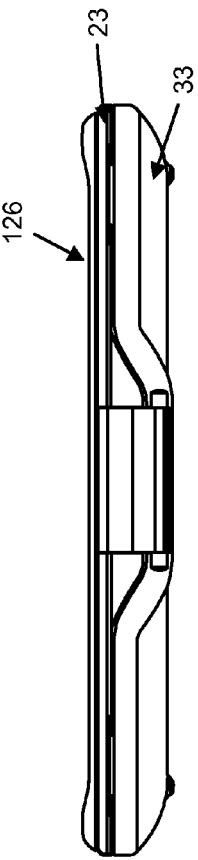

FIG. 17D shows the top of the housing. The stand 126 covering the front of the housing. The curvature of the right 30 and left 33 sides of the bottom member are shown. This curvature is what the side tab 131 wraps around holding the stand 126 to the housing. This could also be accomplished using the curvature or corner of a tablet computer alone. FIG. 17E shows the bottom view.

Figure 18:
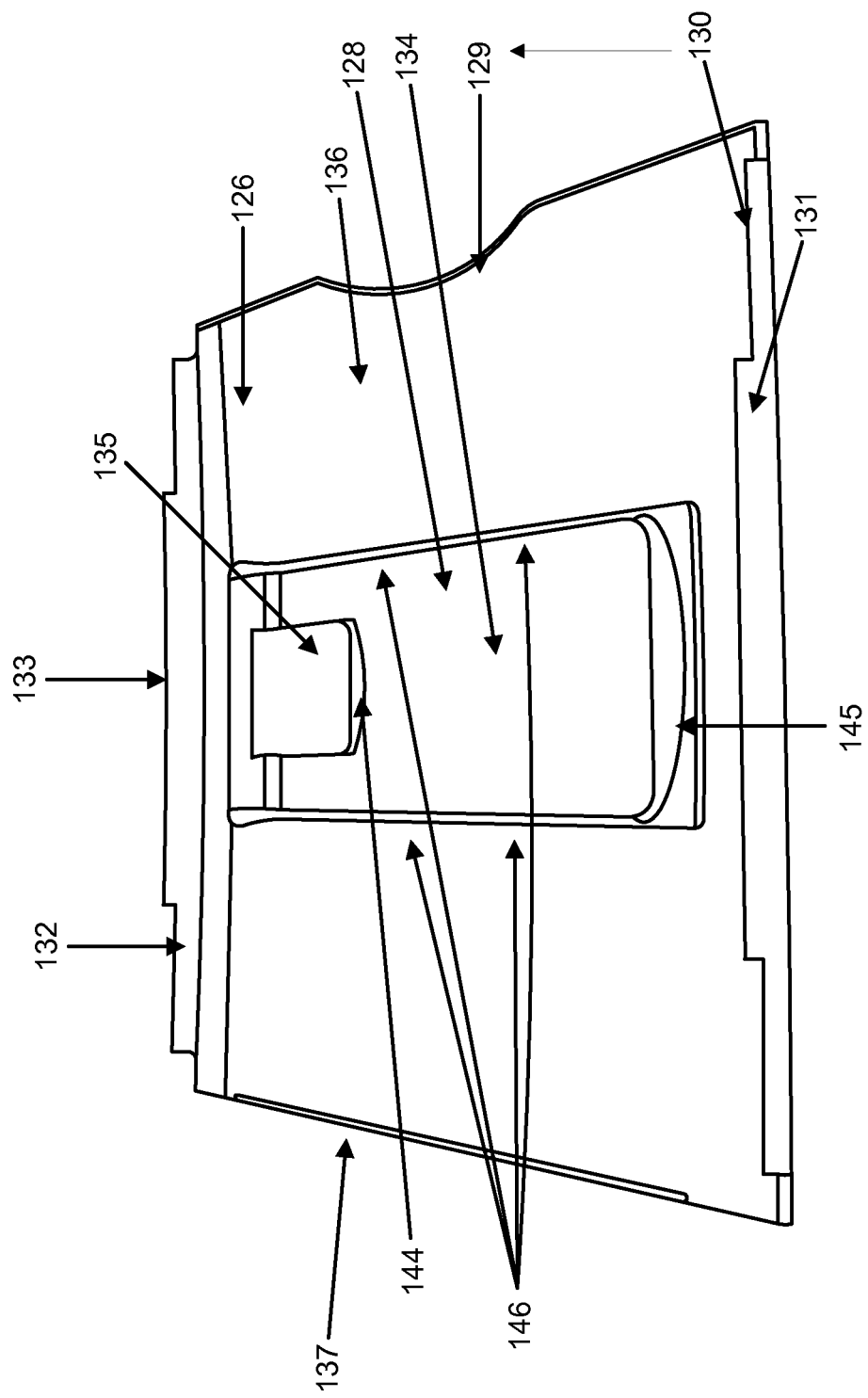
FIG. 18 provides a view of a stand for a tablet computer or a housing for a tablet computer.

FIG. 18 provides a view of the rear surface 136 of the stand 126. The folding member 128 is shown in the center of the rear surface 136. The folding member 128 includes a large 134 and a small 135 folding member. The large folding member 134 has a hinge which allows it to fold up from the rear surface 136. The small folding member 135 fits into a cavity or hole in the large folding member 134. There is a hinge that allows the small folding member to fold up from the large folding member 134 and the rear surface. In certain embodiments, the small folding member 135 can also be folded in towards the rear surface 136 through a hole in the large folding member 134, allowing the small folding member 135 to brace the large folding member 134 when it is folded away from the rear surface 136. This is shown more clearly in later drawings.

FIG. 18 also shows the cut out 129 for the button 40 on the housing or tablet computer. This cut out could be modified to fit any type of tablet computer. FIG. 18 also shows a lip 137 that fits into the depression between the right 20 and left 23 sides of the top member of the housing that is taken up by the aperture for the screen of the tablet computer. The lip 137 helps hold the stand in place when it is placed over the housing. In certain embodiments, the stand is configured for use directly with a tablet computer. Often, tablet computers have a completely flat face instead of a depression at the screen surface surrounded by a raised frame. In these situations, the stand would not have the lip 137 so that it could easily fit on a tablet computer. FIG. 18 also shows the right 130 and left 132 side protectors and right 131 and left 133 side tabs.

FIG. 18 also shows tabs for the large 145 and small 144 folding members. These tabs allow for the folding members to be folded out from their respective cavities. Further, the cavity containing the large folding member 134 contains tabs 146 on its sides. These tabs hold the large folding member 135 in its cavity when the large folding member is snapped into place.

FIG. 19 shows detail from the right side protector 130 and tab 131 (FIG. 19A) and the left side protector 132 and tab 133 (FIG. 19B). FIG. 19A shows that near the right edge of the stand 126 the stand body flares up 142 from a flat portion of the stand body 143 before curving about 90 degrees to form the right side protector 130. FIG. 19A also shows how the right side tab curves in to curve around the right side of the upper member 30 of the stand 126. FIG. 19B shows the same detail on the left side.

These shapes help the stand 126 stay affixed to the side of the housing. It matches the shape of the underlying housing when the stand 126 is stored covering the screen aperture of the housing. In other embodiments, the body of the stand is made to mimic the underlying body of the housing or tablet computer it is used with in order to provide a snug fit when the stand covers the screen of the tablet computer or the screen aperture of a housing.

FIG. 20 shows a side and rear view of the stand 126 in its reading or watching configuration. FIG. 20A is a side view of the stand 126. FIG. 19A shows the angle made by the stand 126 and the flat surface upon which it is placed as two lines originating where the body of the stand 126 meets the table it is on. This angle must be appropriate for watching the tablet computer or housing placed on the stand. In certain embodiments, the angle is between 30 and 89 degrees.

FIG. 20A shows the large 134 and small 135 folding members. Note that in this configuration, the small folding member 135 is folded into a cavity or aperture in the large folding member 134. FIG. 20A also shows the position of the right 130 and left 132 side protectors and right 131 and left 133 side tabs, as well as the top surface of the stand.

FIG. 20B shows a rear angle view of the stand 126. The large 134 and small 135 folding members are shown, as well as the cavity 140 in the rear surface of the stand 136 that allows the large 134 and small 135 folding members to fold into the stand. The hinges for the large 138 and small 139 folding members are shown. The hinge for the large folding member 138 allows the large folding member 134 to fold away from the rear surface 136 of the stand 126. In certain embodiments, the hinge for the small folding member 139 allows the small folding member to fold away from the rear surface and/or the large folding member. In other embodiments, the hinge of the small folding member would also allow the small folding member to fold the other way. In this situation, the small folding member 135 would fold back toward the rear surface 136 of the stand 126. In certain embodiments, a slot would exist in the cavity 140 on the rear surface 136 of the stand 126. This represented by the line drawn across the cavity 140. In certain embodiments, the small folding member 135 would fold back toward the rear surface 136 when the large folding member 134 folds out away from the rear surface 136. The small folding member 135 would then catch in the slot represented by the line in the cavity 140 providing additional stability and support for the large folding member 135 when it is extended out from the rear surface 136.

FIG. 20B also shows the position of the right 130 and left 132 side protectors and right 131 and left 133 side tabs. It also shows the position of the lip 137.

FIG. 21 shows a front view of the stand in reading or watching configuration. FIG. 21A shows the stand with no device. The front surface of the stand 127 is shown. FIG. 21B shows the stand supporting a housing being held in a landscape configuration. FIG. 21C shows the stand supporting a housing being held in a portrait configuration. The stand could also hold a tablet computer without a housing.

Figure 22A:
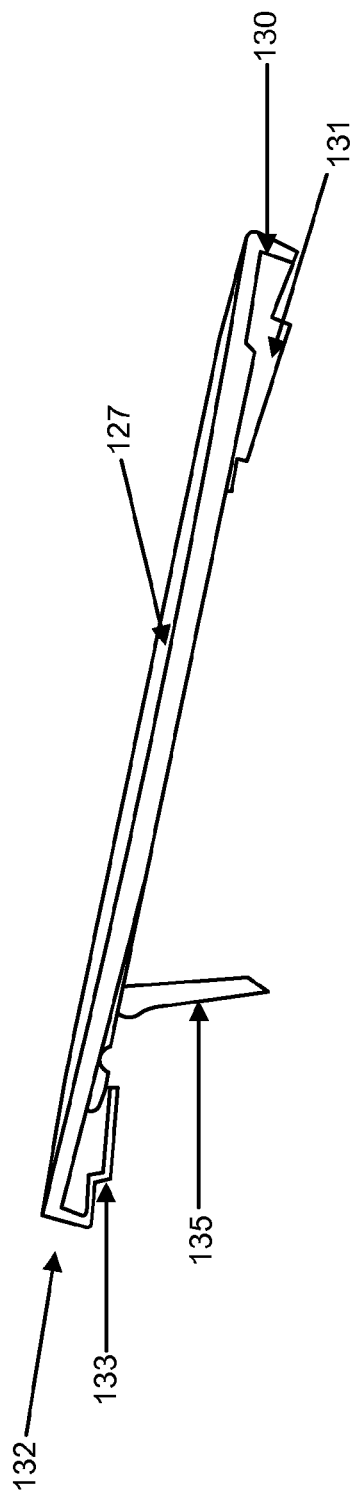
FIGS. 22A-B provide views of stand for a tablet computer or a housing for a tablet computer.

FIG. 22 shows a side and rear view of the stand 126 in its typing configuration. FIG. 22A is a side view of the stand 126. FIG. 22A shows the angle made by the stand 126 and the flat surface upon which it is placed as two lines originating where the body of the stand 126 meets the table it is on. This angle must be appropriate for watching the tablet computer or housing placed on the stand. In certain embodiments, the angle is between 5 and 40 degrees.

FIG. 22A shows the large 134 and small 135 folding members. Note that in this configuration, the large folding member 134 is folded into the cavity 140 in the rear surface 136 of the stand. The small folding member is folded away from the rear surface 136 to meet the table the stand 126 is placed on. FIG. 22A also shows the small cavity 141 that the small folding member 135 folds into in the large folding member. FIG. 22A also shows the position of the right 130 and left 132 side protectors and right 131 and left 133 side tabs, as well as the top surface of the stand.

Figure 22B:
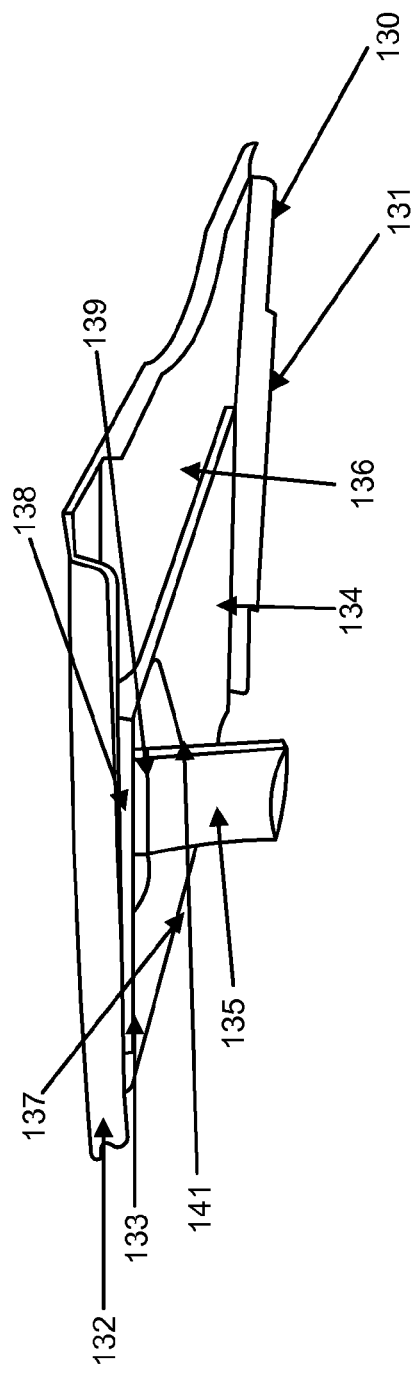

FIG. 22B shows a rear angle view of the stand 126. The large 134 and small 135 folding members are shown, as well as the cavity 141 in the large folding member 134 that allows the small folding member 135 to fold into the stand. The hinges for the large 138 and small 139 folding members are shown. The hinge for the large folding member 138 allows the large folding member 134 to fold into rear surface 136 of the stand 126.

FIG. 22B also shows the position of the right 130 and left 132 side protectors and right 131 and left 133 side tabs. It also shows the position of the lip 137.

FIG. 23 shows a front view of the stand in writing configuration. FIG. 23A shows the stand with no device. The front surface of the stand 127 is shown. FIG. 23B shows the stand supporting a housing being held in a landscape configuration. FIG. 23C shows the stand supporting a housing being held in a portrait configuration. The stand could also hold a tablet computer without a housing.

A stand for a tablet computer can include a flat body that is configured to cover the screen of the tablet computer. The flat body can include a right side and a left side. The right side can include a right side protector and a right side tab. Similarly, the left side can include a left side protector and a left side tab. The side protectors can extend at approximately 80-100 degrees from the surface of the flat body. The side protectors can be configured to cover the right and left side of the tablet computer. The side tabs can be configured to reach around the sides of the body of the tablet computer to removably attach the flat body of the stand to the tablet computer so that the screen of the tablet computer is covered. The stand can also include a first folding member and a second folding member each located on a side of the flat body. The first folding member can be foldably attached to the flat body. The first folding member can have a first length, the second folding member can have a second length, and the first length can be longer than the second length. The second folding member can be foldably attached to the first folding member. The first folding member can fold into a cavity in the flat body. The second folding member can fold into a cavity in the flat body.

In another example, the second folding member can fold into a cavity in the first folding member. The cavity in the first folding member can pass through the first folding member. The second folding member can fold either way through the cavity in the first folding member. The flat body can include a cut-out on its bottom side for allowing access to a control of the tablet computer. The first folding member can include a tab that allows the first folding member to be easily folded out from a cavity in the flat body. Likewise, the second folding member can include a tab that allows the second folding member to be easily folded out from the cavity in the flat body. The second folding member can include a tab that allows the second folding member to be easily folded out from the cavity in the first folding member.

A method of watching or reading from a tablet computer can include placing the tablet computer on the flat body of the stand, where the stand is placed on a flat surface, where the first folding member is extended so that one side of the flat surface and the end of the first folding member contact the flat surface, thereby holding the tablet computer at an angle optimal for viewing or reading from the tablet computer.

A method of typing on a tablet computer can include placing the tablet computer on the flat body of the stand, where the stand is placed on a flat surface, where the second folding member is extended so that one side of the flat surface and the end of the second folding member contact the flat surface, thereby holding the tablet computer at an angle optimal for typing on the tablet computer.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The foregoing description is intended to illustrate but not to limit the scope of the disclosure, which is defined by the scope of the claims. Other embodiments are within the scope of the following claims.

What is claimed is:

1. An apparatus for carrying an electronic device, the apparatus comprising:
   a housing configured to receive an electronic device, the housing comprising a top member and a bottom member to at least partially encase the electronic device, the bottom member comprising a first connection aperture adjacent to a first peg aperture, and a second connection aperture adjacent to a second peg aperture;
   a strap having a first end and a second end, the first end of the strap having a first connector removably disposed within the first connection aperture, the second end of the strap having a second connector removably disposed within the second connection aperture;
   a first connection peg removably disposed within the first peg aperture, wherein a tab of the first connection peg is configured to interlock with a slot of the first connector of the strap, the tab of the first connection peg and the slot of the first connector of the strap interlocking together within the bottom member between the first connection aperture and the first peg aperture to removably couple the strap to the housing; and
   a second connection peg removably disposed within the second peg aperture, wherein a tab of the second connection peg is configured to interlock with a slot of the second connector of the strap, the tab of the second connection peg and the slot of the second connector of the strap interlocking together within the bottom member between the second connection aperture and the second peg aperture to removably couple the strap to the housing.

2. The apparatus of claim 1, wherein the strap comprises a pocket.

3. The apparatus of claim 2, wherein the pocket comprises one or more dividers for storing credit cards or identification cards.

4. The apparatus of claim 2, wherein the pocket comprises a zipper and a zipper garage to cover a zipper head when the zipper is in a closed position.

5. The apparatus of claim 1, wherein the first and second connectors of the strap form watertight seals within the first and second connection apertures, respectively.

6. The apparatus of claim 1, wherein the first and second connection pegs form watertight seals within the first and second peg apertures, respectively.

7. The apparatus of claim 1, wherein the strap extends diagonally over a bottom surface of the bottom member.

8. The apparatus of claim 1, wherein the strap extends horizontally over a bottom surface of the bottom member.

9. The apparatus of claim 1, wherein the strap extends vertically over a bottom surface of the bottom member.

10. The apparatus of claim 1, wherein the first connection aperture and the first peg aperture are located proximate a first corner of the bottom member.

11. The apparatus of claim 10, wherein the second connection aperture and the second peg aperture are located proximate a second corner of the bottom member.

12. The apparatus of claim 1, wherein the strap further comprises an adjustable closure mechanism to accommodate a wide variety of hand sizes between the strap and a bottom surface of the bottom member.

13. The apparatus of claim 1, wherein the top member and the bottom member of the housing engage to form a waterproof seal.

14. The apparatus of claim 13, wherein the bottom member of the housing includes a latch door positioned to provide access to a feature of the encased electronic device, the latch door configured to be waterproof in a closed position.

15. The apparatus of claim 1, wherein the top member of the housing includes a membrane configured to cover a touchscreen of the encased electronic device.

16. The apparatus of claim 1, wherein the bottom member of the housing includes a lens feature positioned to align with a camera of the encased electronic device.

* * * * *